United States Patent
Jeon et al.

(10) Patent No.: US 11,184,727 B2
(45) Date of Patent: Nov. 23, 2021

(54) AUDIO SIGNAL PROCESSING METHOD AND DEVICE

(71) Applicant: GAUDIO LAB, INC., Seoul (KR)

(72) Inventors: Sewoon Jeon, Daejeon (KR); Sangbae Chon, Seoul (KR); Jeonghun Seo, Seoul (KR)

(73) Assignee: GAUDIO LAB, INC., Seoul (KR)

( * ) Notice: Subject to any disclaimer, the term of this patent is extended or adjusted under 35 U.S.C. 154(b) by 0 days.

(21) Appl. No.: 16/584,812

(22) Filed: Sep. 26, 2019

(65) Prior Publication Data

US 2020/0037091 A1 Jan. 30, 2020

Related U.S. Application Data

(63) Continuation of application No. PCT/KR2018/003580, filed on Mar. 27, 2018.

(30) Foreign Application Priority Data

Mar. 27, 2017 (KR) .......................... 10-2017-0038761
Jul. 14, 2017 (KR) .......................... 10-2017-0089711

(51) Int. Cl.
*H04S 1/00* (2006.01)
*H04S 3/00* (2006.01)
(Continued)

(52) U.S. Cl.
CPC .............. *H04S 1/007* (2013.01); *H04N 9/806* (2013.01); *H04S 3/008* (2013.01); *H04S 7/303* (2013.01)

(58) Field of Classification Search
CPC . G06F 3/16; G06F 3/162; G06F 3/165; G06F 3/167; G10L 19/008; H04N 9/806;
(Continued)

(56) References Cited

U.S. PATENT DOCUMENTS

2002/0151997 A1* 10/2002 Wilcock ............... G11B 19/025 700/94
2003/0007648 A1* 1/2003 Currell .................... H04S 7/305 381/61

(Continued)

FOREIGN PATENT DOCUMENTS

CN 102572676 7/2012
JP 2009-105565 5/2009
(Continued)

OTHER PUBLICATIONS

International Search Report for PCT/KR2018/003580 dated Jul. 11, 2018 and its English translation from WIPO (now published as WO 2018/182274).

(Continued)

Primary Examiner — Andrew C Flanders
(74) Attorney, Agent, or Firm — Ladas & Parry, LLP

(57) ABSTRACT

An audio signal processing apparatus including a receiving unit receiving an input audio signal, a processor generating an output audio signal reproducing a virtual sound source corresponding to the input audio signal in a virtual space, and an output unit outputting an output audio signal generated by the processor is disclosed. The processor may obtain spatial information related to the virtual space including a virtual sound source corresponding to the input audio signal and a listener, filter the input audio signal based on a location of the virtual sound source and the spatial information to generate at least one reflected sound corresponding to each of at least one mirror plane in the virtual space, obtain a relative location of a virtual reflect sound source with respect to a location and a view-point of the listener, based on information of the view-point of the listener and a location of the virtual reflect sound source corresponding to each of the at least one reflected sound, and binaural render the at least one reflected sound, based on the relative (Continued)

location of the virtual reflect sound source corresponding to each of the at least one reflected sound.

13 Claims, 12 Drawing Sheets

(51) Int. Cl.
*H04S 7/00* (2006.01)
*H04N 9/806* (2006.01)

(58) Field of Classification Search
CPC ...... H04S 1/005; H04S 1/007; H04S 2400/11; H04S 2420/01; H04S 2420/03; H04S 2420/11; H04S 3/00; H04S 3/008; H04S 3/02; H04S 7/30; H04S 7/302; H04S 7/303; H04S 7/304; H04S 7/305; H04S 7/306

See application file for complete search history.

(56) References Cited

U.S. PATENT DOCUMENTS

| | | | | |
|---|---|---|---|---|
| 2006/0109988 | A1* | 5/2006 | Metcalf | H04S 3/002 381/104 |
| 2006/0115100 | A1* | 6/2006 | Faller | G10L 19/008 381/119 |
| 2007/0025560 | A1* | 2/2007 | Asada | H04R 29/00 381/61 |
| 2007/0269063 | A1* | 11/2007 | Goodwin | H04S 7/30 381/310 |
| 2008/0031462 | A1 | 2/2008 | Walsh et al. | |
| 2008/0056517 | A1* | 3/2008 | Algazi | H04S 7/304 381/310 |
| 2008/0232602 | A1* | 9/2008 | Shearer | H04S 7/302 381/17 |
| 2008/0273721 | A1* | 11/2008 | Walsh | H04S 5/00 381/300 |
| 2010/0150359 | A1* | 6/2010 | KnicKrehm | G06F 30/13 381/58 |
| 2012/0093320 | A1* | 4/2012 | Flaks | A63F 13/44 381/17 |
| 2012/0201389 | A1* | 8/2012 | Emerit | H04S 1/002 381/23 |
| 2012/0206452 | A1* | 8/2012 | Geisner | H04S 7/304 345/419 |
| 2013/0083173 | A1* | 4/2013 | Geisner | G06F 3/1423 348/51 |
| 2015/0223002 | A1* | 8/2015 | Mehta | H04S 7/30 381/303 |
| 2015/0286463 | A1* | 10/2015 | Asada | G06F 3/162 700/94 |
| 2015/0350628 | A1* | 12/2015 | Sanders | H04N 5/2224 345/419 |
| 2016/0227338 | A1* | 8/2016 | Oh | H04S 7/303 |
| 2017/0094440 | A1* | 3/2017 | Brown | H04S 7/30 |
| 2017/0188172 | A1* | 6/2017 | Horbach | H04S 7/304 |
| 2017/0257724 | A1* | 9/2017 | Bosnjak | H04S 7/304 |
| 2017/0332186 | A1* | 11/2017 | Riggs | H04S 7/301 |
| 2018/0139565 | A1* | 5/2018 | Norris | H04S 7/304 |
| 2018/0192226 | A1* | 7/2018 | Woelfl | G10K 11/17815 |
| 2018/0249274 | A1* | 8/2018 | Lyren | H04S 7/303 |
| 2019/0208348 | A1* | 7/2019 | Reijniers | H04R 3/04 |

FOREIGN PATENT DOCUMENTS

| | | |
|---|---|---|
| KR | 10-2011-0039545 | 4/2011 |
| WO | 2016/130834 | 8/2016 |
| WO | 2018/182274 | 10/2018 |

OTHER PUBLICATIONS

Written Opinion of the International Searching Authority for PCT/KR2018/003580 dated Jul. 11, 2018 and its English translation by Google Translate (now published as WO 2018/182274).

* cited by examiner

AUDIO SIGNAL PROCESSING METHOD AND DEVICE

CROSS-REFERENCE TO RELATED APPLICATIONS

This application is a continuation of International Patent Application No. PCT/KR2018/003580 filed on Mar. 27, 2018, which claims the priority to Korean Patent Application No. 10-2017-0038761 filed on Mar. 27, 2017 and Korean Patent Application No. 10-2017-0089711 filed on Jul. 14, 2017, the entire contents of which are incorporated herein by reference.

TECHNICAL FIELD

The present disclosure relates to a signal processing method and apparatus for effectively reproducing an audio signal, and more particularly, an audio signal processing method and apparatus for implementing immersive binaural rendering for a portable device including a head mounted display (HMD) device.

BACKGROUND ART

Binaural rendering technology is essential to provide immersive and interactive audio in Head Mounted Display (HMD) devices. Binaural rendering is a modeling of 3D audio as a signal delivered to the human ears in 3D space. Listeners may also feel stereoscopic sound through binaural rendered 2-channel audio output signals through headphones or earphones. The specific principle of binaural rendering is as follows. Human being always hears the sound through both ears, and recognizes the location and the direction of the sound source through the sound. Thus, if 3D audio can be modeled in the form of an audio signal that is delivered to both ears of the human being, the stereoscopic sense of 2D audio can be reproduced through two-channel audio output without a large number of speakers.

In this case, in a mobile device subject to constraints of an operation ability and power consumption, a burden of power consumption and an amount of computation may occur due to an increase in the target objects or channels of the binaural rendering. In addition, technology that reproduces spatial audio reflecting the characteristics of virtual space such as room reverberation effects is important factor tor increase the realism and make the virtual reality (VR) device user feel completely immersed in VR. In this case, a Room Impulse Response (RIR) typically has a long filter shape ranging from tens of msec to several seconds on the time domain, and in order to apply it in a convolution form to the signal in real time, it is inevitable to use a large amount of computation and memory. In general, the longer the length of the filter, the more spacious and reverberant the sound of the room can be reproduced. Therefore, using all the data in the filter as much as possible is important in terms of real-space sound reproduction.

In addition, in accordance with properties of the virtual reality device and VR contents, the spatial structure can be changed, or real-time locations of the listener and the sound source or the view-point of the listener can be changed. Therefore, the spatial reverberation filter must be updated in real-time to reflect that information. A measured RIR filter measured in arbitrary area is difficult to reflect the properties changing in real-time, because it contains the sound information with respect to the fixed location and the fixed space. In addition, when using a head mount display (HMD) capable of head tracking that tracks the view-point information of the listener, a binaural signal reflecting the view-point of the user should be played back through headphones or earphones. Moreover, when the listener moves, the binaural spatial sound that the listener listens to in the virtual space can be changed. In general, the former can be referred to as a 3DOF (degree of freedom) environment, the latter can be referred to as a 6DOF environment. In this way, a function capable of responding to the view-point or the location of the user is called interactive.

Meanwhile, artificial reverberator is a method of generating the spatial sounds that are difficult to measure, it may generate the spatial sound signal in consideration of information of a specific room space and location information of an audio object and a user. Spatial sounds consist of direct component, early reflection component, and late reverberation component. The direct and the early reflection have interactive property that the signals heard at both ears change depending on the view-point of the user. On the other hand, the late reverberation is a signal reflecting the characteristics of the space and does not change greatly depending on the view-point or location of the listener. Using the characteristics of these components of the reverberation, the artificial reverberator may be used as a technique of generating the spatial sounds of the virtual space in the virtual reality. Accordingly, in the mobile device subject to constraints of an operation ability and power consumption, the technology for reproducing the spatial sounds for the input audio signal efficiently to be required.

DISCLOSURE OF THE INVENTION

Technical Problem

An object of an embodiment of the present disclosure is to solve the problem of generating a spatial sound corresponding to an input audio signal in real time and implementing the same as a binaural signal for a virtual reality device. In addition, the present disclosure has an object to reduce the amount of system computation required to reproduce the spatial sound corresponding to the input audio signal. More particularly, the present disclosure has an object of reproducing the spatial sound in which an interactive of a user is reflected by using a relatively small amount of computation.

Technical Solution

According to an embodiment of the present invention, an audio signal processing apparatus for rendering an input audio signal may include a receiver configured to receive the input audio signal a processor configured to generate an output audio signal for reproducing a virtual sound source corresponding to the input audio signal in a virtual space and an output unit configured to output the output audio signal generated by the processor. The processor is configured to obtain spatial information related to the virtual space including a virtual sound source corresponding to the input audio signal and a listener, filter the input audio signal based on a location of the virtual sound source and the spatial information to generate at least one reflected sound corresponding to each of at least one mirror plane in the virtual space, obtain a relative location of a virtual reflect sound source with respect to a location and a view-point of the listener, based on information of the view-point of the listener and a location of the virtual reflect sound source corresponding to each of the at least one reflected sound, and binaural render the at least one reflected sound, based on the relative location of the virtual reflect sound source corresponding to each of the at least one reflected sound.

The processor may obtain a spectral modification filter corresponding to each of the at least one reflected sound based on the relative location of the virtual reflected sound source, and binaural render the at least one reflected sound filtered based on the spectral modification filter to generate the output audio signal.

The spectral modification filter is a filter modeling a predetermined frequency characteristic of an incident sound according to an incident angle of the sound incident on the listener with respect to the view-point of sight of the listener.

The processor may obtain a second spectral modification filter corresponding to one of incident angles included in a front side of the view-point of the listener, and a second spectral modification filter one of incident angles included in a rear side of the view-point of the listener, generate the spectral modification filter corresponding to each of the at least one reflected sound by weighted summing the first spectral modification filter and the second spectral modification filter based on the relative location of the virtual reflect sound source, and binaural render the at least one reflected sound filtered based on the spectral modification filter to generate the output audio signal.

The second spectral modification filter is a filter that attenuates an output of a high frequency band compared to the first spectral modification filter.

The processor may obtain a transfer function corresponding to each of the at least one reflected sound based on the relative location of the virtual reflect sound source, obtain a binaural parameter pair corresponding to each of the at least one reflected sound based on at least a portion of the transfer function, and binaural render the at least one reflected sound based on the binaural parameter pair to generate the output audio signal.

The binaural parameter pair includes an ipsilateral attenuation gain and a contralateral attenuation gain. Here, the processor may obtain an interaural level difference indicating a difference in sound level between an ipsilateral side and a contralateral side based on the transfer function, obtain the ipsilateral attenuation gain and the contralateral attenuation gain corresponding to each of the at least one reflected sound, based on the at least a portion of the transfer function and the interaural level difference between, and binaural render the at least one reflected sound based on the ipsilateral attenuation gain and the contralateral attenuation gain to generate the output audio signal.

The binaural parameter pair includes an ipsilateral delay and a contralateral delay. Here, the processor may obtain an interaural time difference indicating a time delay difference between an ipsilateral side and a contralateral side based on the transfer function, obtain the ipsilateral delay and the contralateral delay corresponding to each of the at least one reflected sound based on the interaural time difference, and binaural render the at least one reflected sound based on the ipsilateral delay and the contralateral delay to generate the output audio signal.

The processor may obtain at least one updated reflected sound and an updated binaural parameter pair corresponding to each of the at least one updated reflected sound, based on a change in the locational relationship between the virtual sound source and the listener, and apply a fade-out window to a first set of reflected sounds generated by binaural rendering the at least one reflected sound based on the binaural parameter pair, and apply a fade-in window to a second set of reflected sound generated by binaural rendering the updated at least one reflected sound based on the updated binaural parameter pair to generate the output audio signal.

The processor may transform the at least one reflected sound to a first m-th order ambisonics signal, based on location information indicating the relative location of the virtual reflect sound source corresponding to each of the at least one reflected sound and a basis of m-th order spherical harmonic, and binaural render the first m-th order ambisonics signal to generate the output audio signal.

The processor may update the view-point of the listener based on the head movement information of the listener, generate a second m-th order ambisonics signal by rotating the first m-th order ambisonics signal based on the updated view-point of the listener and a rotation matrix, and generate the output audio signal based on the second m-th order ambisonics signal.

The processor may determine a reference reflection order based on the spatial information, filtering the input audio signal based on the spatial information to generate a late reverberation having a reflection order that exceeds the reference reflection order, and generate an output audio signal including the generated late reverberation and the at least one binaural rendered reflected sound.

The spatial information includes mirror plane number information indicating the number of the mirror plane. Here, the processor may determine the reference reflection order based on the mirror plane number information and a processing performance of the processor.

The spatial information includes a reflectance corresponding to each of the at least one mirror plane. Here, the processor may filter the input audio signal based on the reflectance to generate the at least one reflected sound.

The processor may determine attenuation gain and delay corresponding to each of the at least one mirror plane based on a distance between the listener and each of the virtual reflect sound source, and filtering the input audio signal based on the attenuation gain and the delay to generate the at least one reflected sound.

Audio signal processing method according to an embodiment of the present invention, the method including: receiving the input audio signal, obtaining spatial information related to the virtual space including a listener and a virtual sound source corresponding to the input audio signal, generating at least one reflected sound corresponding to each of at least one mirror plane in the virtual space by filtering the input audio signal based on a location of the virtual sound source and the spatial information, obtaining a relative location of a virtual reflect sound source with respect to a location and a view-point of the listener based on a location of the virtual reflect sound source corresponding to each of the at least one reflected sound and view-point information of the listener, and binaural rendering the at least one reflected sound based on the relative location of the virtual reflect sound source corresponding to each of the at least one reflected sound to output the output audio signal.

A computer-readable recording medium according to another aspect may include a recording medium recording a program for executing the above-described method on a computer.

Advantageous Effects

According to an embodiment of the present disclosure, a spatial sound reflecting the geometrical or physical space characteristics of a virtual space may be generated to increase a user's immersion in the virtual space. In addition, according to an embodiment of the present disclosure, it is possible to effectively implement a binaural spatial sound supporting an interactive function.

According to one embodiment of the present disclosure, it is possible to reproduce the spatial sound reflecting the interaction of the user by using a relatively small amount of computation. In addition, according to another embodiment of the present disclosure, a large number of reflected sound components may be transmitted with a relatively small amount of data.

MODE FOR CARRYING OUT THE INVENTION

The terminology used herein is a general term that is widely used at present, while considering the functions of the present disclosure, but may be selected depending on the intention of those skilled in the art, custom or the emergence of new technology. In addition, in certain cases, there is a term arbitrarily selected by the applicant, and in this case, the meaning will be described in the corresponding description of the disclosure. Therefore, it is to be understood that the terminology used herein is to be interpreted based on the actual meaning of the term and the contents throughout the specification, rather than simply on the name of the term.

The present disclosure relates to a method in which an audio signal processing apparatus generates an output audio signal by binaural rendering an input audio signal. An audio signal processing apparatus and method according to an embodiment of the present disclosure may generate an output audio signal that is located in a virtual space and reproduces a virtual sound source corresponding to an input audio signal. In this case, the audio signal processing apparatus may generate a spatial sound corresponding to the input audio signal in order to reproduce the virtual sound source. The present disclosure relates to the audio signal processing apparatus and method for reproducing spatial sound and providing a binaural rendering spatial sound including an interactive function in a virtual space to a listener while reducing the amount of computation required to generate reflected sound.

Hereinafter, the present invention will be described in detail with reference to the accompanying drawings.

Figure 1:
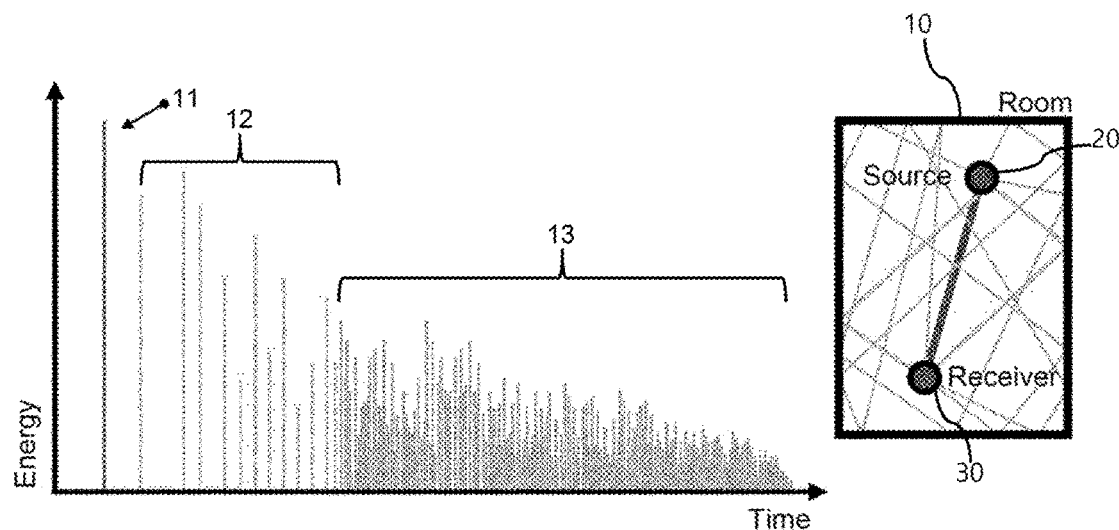
FIG. 1 illustrates an acoustic component included in a spatial sound according to an embodiment of the present disclosure.

FIG. 1 illustrates an acoustic component included in a spatial sound according to an embodiment of the present disclosure. Referring to FIG. 1, the spatial sound may include a direct sound 11 and reflected sound components. In this case, the reflected sound components may include an early reflection 12 component and a late reverberation 13 component. In this case, the reflected sound may be divided into the early reflection 12 and the late reverberation 13 based on at least one of a degree of attenuation, a delay, and a reflection order of the reflected sound. Here, the reflection order may be the number of times that a specific reflected sound is reflected on a mirror plane in the virtual space 10 until the reflected sound reaches to both ears of a listener 30.

As shown in FIG. 1, the late reverberation 13 may have a greater degree of attenuation than the early reflection 12. The audio signal processing apparatus may classify the early reflection 12 that is less than a predetermined degree of attenuation and the late reverberation 13 that is more than the predetermined degree of attenuation, based on the predetermined degree of attenuation. The predetermined degree of attenuation may be defined as a specific decibel, such as −15 dB or −30 dB. Also, as illustrated in FIG. 1, the late reverberation 13 may have a longer delay than the early reflection 12. The audio signal processing apparatus may classify the early reflection 12 that is less than a predetermined delay and the late reverberation 13 that is more than the predetermined delay, based on the predetermined delay.

According to an embodiment, the audio signal processing apparatus may classify the early reflection 12 and the late reverberation 13 based on a reference reflection order. The audio signal processing apparatus may classify the reflected sound having a reflection order exceeding the reference reflection order into the late reverberation 13 and the reflected sound having a reflection order less than or equal to the reference reflection order as the early reflection 12. The audio signal processing apparatus may generate an early reflection 12 having a reflection order less than or equal to the reference reflection order based on the spatial information related to the virtual space 10 and a view-point of the listener. In addition, the audio signal processing apparatus may generate a late reverberation 13 having a reflection order exceeding the reference reflection order by filtering the input audio signal based on the spatial information. Alternatively, the audio signal processing apparatus may generate only a reflected sound having a reflection order less than or equal to the reference reflection order in the virtual space 10.

In this case, the reference reflection order may be a value specified by the user or a default value stored in the audio signal processing apparatus. Alternatively, the audio signal processing apparatus may determine the reference reflection order based on spatial information related to the virtual space 10. For example, the audio signal processing apparatus may determine the reference reflection order based on the size information of the virtual space. This is because the delay of the early reflection according to the reflection order may vary depending on the size of the virtual space. Also, the audio signal processing apparatus may determine the reference reflection order based on information of the number of mirror planes included in the virtual space. This is because the number of early reflections according to the reflection order may vary depending on the number of mirror planes included in the virtual space. Also, the audio signal processing apparatus may determine the reference reflection order based on the reflectance of each of the mirror planes. This is because the attenuation gain of the early reflection may vary depending on the reflectance of each mirror plane.

In addition, the audio signal processing apparatus may determine the reflection order based on the processing performance of the processor. This is because the calculation amount of the audio signal processing apparatus for generating the reflected sound may increase as the reflection order increases. Here, the processing performance of the audio signal processing apparatus may include a processing speed of the processor included in the audio signal processing apparatus. This is because the resources that can be allocated to the operation for generating the reflected sound may be limited according to the processing speed of the processor. In addition, the processing performance of the audio signal processing apparatus may include a computing capability of a memory or a GPU included in the audio signal processing apparatus. According to an embodiment, the audio signal processing apparatus may determine the reflection order based on mirror plane number information indicating the number of mirror planes included in the virtual space 10 and processing performance of the processor. This is because even when the reflection orders are the same, the number of reflected sounds generated may vary depending on the number of mirror planes included in the virtual space 10.

The listener 30 may detect the location of the virtual sound source 20 in the virtual space 10 by sensing the direct sound 11. Also, the listener 30 detects the early reflection 12 and the late reverberation 13 generated by the characteristics of the virtual space 10, and thus the location of the listener 30 in the virtual space 10, and the size and characteristics of the virtual space 10 can be identified. In detail, the listener 30 may recognize the characteristics of the virtual space through the direction and the magnitude of each early reflection 12 reaching. In addition, the listener 30 may recognize the characteristics of the virtual space based on the energy of the late reverberation 13 and the level difference of the late reverberation 13 reaching the both ears of the listener 30, respectively. The late reverberation 13 may be a diffused signal. For example, late reverberation 13 may represent a non-diegetic sound or an ambience effect.

Referring to FIG. 1, in the time domain, the early reflection 12 and the late reverberation 13 are delayed compared to the direct sound 11. Accordingly, the audio signal processing apparatus may generate a reflected sound corresponding to the input audio signal by using a reflected sound filter having a length of tens of milli-seconds to several seconds in the time domain. In this case, the audio signal processing apparatus may consume a large amount of computational resources and memory to generate the reflected sound. This is because the audio signal processing apparatus 100 generates the reflected sound by applying the reflected sound filter to the input audio signal in a convolutional form.

In addition, the direct sound 11 and the early reflection 12 may have an interactivity characteristic in which an audio signal heard from both ears of the listener 30 changes according to the view-point or the location of the listener 30. On the other hand, in the late reverberation 13, the amount of change in accordance with the direction or the view-point of the listener 30 may be smaller than the amount of change in the direct sound 11 or the early reflection 12. Accordingly, in the spatial acoustic environment in which the listener 30 has a change in the visual direction, the audio signal processing apparatus may generate the early reflection 12 reflecting the interactive according to the head tracking of the listener. In this case, in order to provide an immersive output audio signal to the listener 30, the audio signal processing apparatus may need to generate or store the reflected sound filter for each of the view-points of the listener 30. According to an embodiment of the present disclosure, an apparatus and a method for processing an audio signal may reduce a computation amount and a memory consumption required for reflected sound generation. A method for generating and binaural rendering the reflected sound efficiently in terms of calculation amount in which the audio signal processing apparatus will be described in detail with reference to FIGS. 6 to 20.

Figure 2:
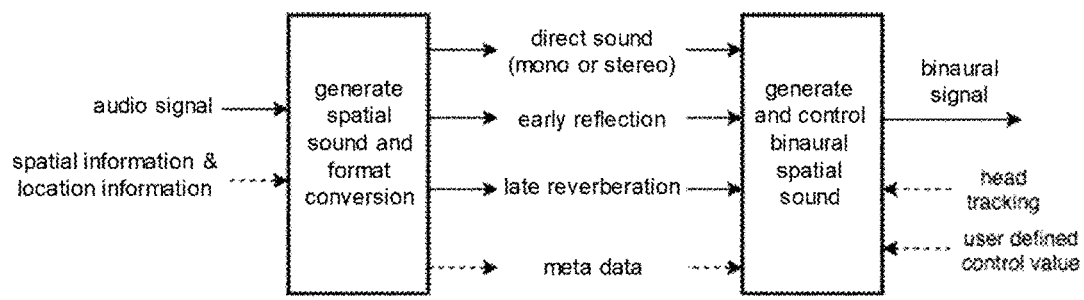
FIG. 2 illustrates a method of generating an output audio signal for reproducing a spatial sound corresponding to an input audio signal based on the input audio signal by an audio signal processing apparatus according to an embodiment of the present disclosure.

Hereinafter, a method of generating an output audio signal reproducing a virtual sound source corresponding to an input audio signal in a virtual space by an audio signal processing apparatus according to an embodiment of the present disclosure will be described with reference to FIG. 2. FIG. 2 illustrates a method of generating an output audio signal for reproducing a spatial sound corresponding to an input audio signal based on the input audio signal by an audio signal processing apparatus according to an embodiment of the present disclosure.

According to an embodiment of the present disclosure, the audio signal processing apparatus may generate spatial sound corresponding to the input audio signal using spatial information related to the virtual space 10. Here, the spatial information may be information representing structural and physical characteristics of the virtual space 10. For example, the spatial information may include at least one of a size of the virtual space 10, a scale defining the virtual space 10, the number of mirror plane included in the virtual space 10, a location of at least one mirror plane, and a reflectance corresponding to each of the at least one mirror plane. Here, the reflectance may be a value determined based on the structural and/or physical characteristics of the mirror plane reflecting the sound. For example, the reflectance may include a wall absorption coefficient that indicates the degree to which plane wave perpendicular to the mirror plane is absorbed by the mirror plane. In this case, the wall absorption coefficient may be a measured result for the mirror plane. The reflectance may vary depending on the materials constituting the mirror plane. The reflectance may vary depending on the structure of the mirror plane. At least one reflected sound corresponding to the input audio signal may include the aforementioned early reflection and late reverberation component.

Referring to FIG. 2, an audio signal processing apparatus may obtain spatial information related to a virtual space 10 including a virtual sound source 20 and a listener 30 corresponding to an input audio signal. The audio signal processing apparatus may obtain spatial information together with the input audio signal through the receiver 110 to be described later. Alternatively, the audio signal processing apparatus may obtain spatial information related to the virtual space 10 through a separate input device. In addition, the audio signal processing apparatus may generate spatial sound through different processing for each component. As shown in FIG. 2, the audio signal processing apparatus may generate the early reflection 12 and the late reverberation 13 based on the input audio signal and the spatial information. In addition, the audio signal processing apparatus may generate an output audio signal by synthesizing and/or rendering the generated sound source.

According to an embodiment, the audio signal processing apparatus may binaural render the direct sound 11 based on the relative location of the virtual sound source 20 corresponding to the direct sound 11 with respect to the listener 30. The audio signal processing apparatus may obtain a transfer function pair based on the relative location of the virtual sound source corresponding to the direct sound 11. In this case, the transfer function pair may include at least one transfer function. For example, the transfer function pair may include a pair of transfer functions corresponding to both ears of listeners. The transfer function pair may include an ipsilateral transfer function and a contralateral transfer function. Specifically, the transfer function pair may include an ipsilateral Head Related Transfer Function (HRTF) corresponding to a channel for ipsilateral ear and a contralateral HRTF corresponding to a channel for contralateral ear.

The transfer function may be measured in an anechoic chamber. In addition, the transfer function may include information about the HRTF estimated by the simulation. The simulation techniques used to estimate the HRTF may include at least one of the spherical head model (SHM), the snowman model, the finite-difference time-domain method (FDTDM), and the boundary element method (BEM). In this case, the spherical head model represents a simulation technique for assuming that a human head is a ball. In addition, the Snowman model represents a simulation technique that simulates under the assumption that a human head and body are a sphere. The transfer function may be a fast Fourier transform of an impulse response (IR), but the transformation method is not limited thereto. In the present disclosure, the transfer function may include binaural transfer functions used for binaural rendering of a sound source. The transfer functions may include at least one of HRTF, Interaural Transfer Function (ITF), Modified ITF (MITF), Binaural Room Transfer Function (BRTF), Room Impulse Response (RIR), Binaural Room Impulse Response (BRIR), Head Related Impulse Response (HRIR), and modified and edited data thereof, and the present disclosure is not limited thereto. For example, the binaural transfer function may include a secondary binaural transfer function obtained by linearly combining a plurality of binaural transfer functions.

In addition, when the relative location of the virtual sound source 20 changes with respect to the listener 30, the audio signal processing apparatus may update the transfer function to binaural render the direct sound 11. This is because the relative location of the virtual sound source 20 representing the direct sound 11 should be moved according to the view-point of the listener 30 in the virtual space 10. For example, the relative location of the virtual sound source 20 representing the direct sound 11 may move in a direction opposite to the view-point of the listener 30.

According to an embodiment, the audio signal processing apparatus may generate the early reflection 12 based on the input audio signal and the spatial information. For example, the audio signal processing apparatus may generate the early reflection 12 based on the location of the virtual reflect sound source. In the present disclosure, the virtual reflect sound source may be a virtual sound source corresponding to one reflected sound reflected on the mirror plane included in the virtual space 10. The audio signal processing apparatus may obtain a transfer function pair based on the relative location of the virtual reflect sound source. In addition, the audio signal processing apparatus may binaural render the early reflection 12 based on the obtained transfer function pair. Here, the relative location of the virtual reflect sound source may indicate the location of the virtual reflect sound source with respect to the direction and the view-point of the listener 30. In this case, the audio signal processing apparatus may process the virtual reflect sound source according to the embodiment described above with respect to the method for binaural rendering the direct sound 11. Accordingly, the audio signal processing apparatus may provide the listener with realistic and immersive spatial sound. A method of generating a reflected sound by the audio signal processing apparatus will be described in detail with reference to FIGS. 4 to 20 to be described later.

According to an embodiment of the present disclosure, the audio signal processing apparatus 100 may generate the reflected sound through a separate process for the early reflection 12 and the late reverberation 13 described above which are distinguished from each other. For example, the early reflection 12 may be generated in the embodiments to be described with reference to FIGS. 4 to 18, and the late reverberation 13 may be generated through a separate process. Hereinafter, the method of generating late reverberation 13 will be described.

According to an embodiment, the audio signal processing apparatus may generate the late reverberation 13 based on spatial information related to the virtual space 10. Since the late reverberation 13 is a distributed component that is heard regardless of the location or the view-point of the listener 30 in the virtual space, the listener 30 may identify the size of the virtual space 10 through the late reverberation 13. In addition, the audio signal processing apparatus may generate late reverberation 13 using a filter type having a larger delay than the early reflection 12. This is because the late reverberation 13 has a larger reflection order than the early reflection 12. For example, the audio signal processing apparatus may generate the late reverberation 13 by filtering the input audio signal based on the spatial information. In detail, the audio signal processing apparatus 100 may determine the attenuation gain and the delay corresponding to the reflection order based on the reflection order and the spatial information. Also, the audio signal processing apparatus 100 may generate the late reverberation 13 based on the attenuation gain and the delay corresponding to the reflection order. The late reverberation 13, unlike the early reflections 12, may not reflect the interactive according to the head tracking of the listener 30. In the case of late reverberation, the influence of the view-point of the listener 30 is relatively lower than the early reflection.

Figure 3:
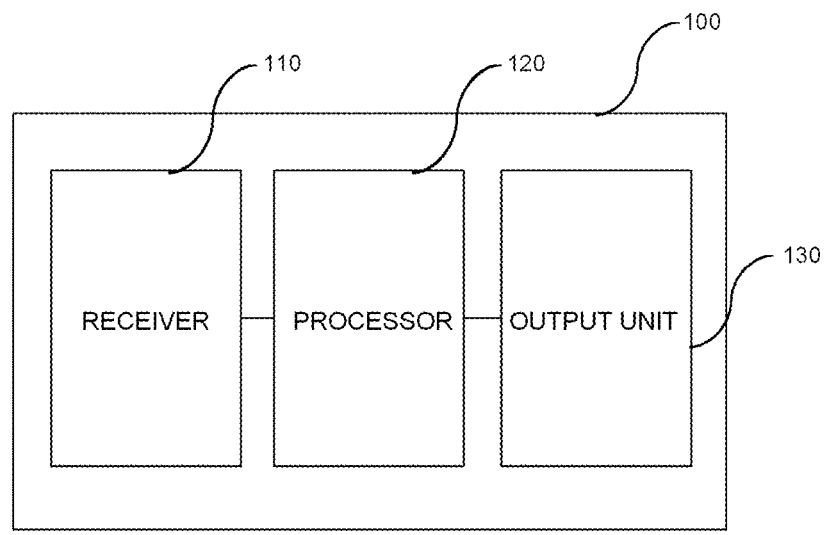
FIG. 3 is a block diagram illustrating a configuration of an audio signal processing apparatus according to an embodiment of the present disclosure.

FIG. 3 is a block diagram illustrating a configuration of an audio signal processing apparatus 100 according to an embodiment of the present disclosure. According to an embodiment, the audio signal processing apparatus 100 may include a receiver 110, a processor 120, and an output unit 130. However, not all of the elements illustrated in FIG. 3 are essential elements of the audio signal processing device. The audio signal processing device 100 may additionally include elements not illustrated in FIG. 3. Furthermore, at least some of the elements of the audio signal processing device 100 illustrated in FIG. 3 may be omitted.

The receiver 110 may receive an audio signal. The receiver 110 may receive an input audio signal input to the audio signal processing apparatus 100. The receiver 110 may receive an input audio signal that is a target of binaural rendering by the processor 120. Herein, the input audio signal may include at least one of an object signal and a channel signal. In this case, the input audio signal may be an object or a mono signal. Alternatively, the input audio signal may be a multi-object or a multi-channel signal. According to an embodiment, when the audio signal processing apparatus 100 includes a separate decoder, the audio signal processing apparatus 100 may receive an encoded bit stream of the input audio signal.

According to an embodiment, the receiver 110 may be equipped with a receiving means for receiving an input audio signal. For example, the receiver 110 may include an audio signal input port for receiving an input audio signal transmitted by wire. Alternatively, the receiver 110 may include a wireless audio receiving module for receiving an audio signal transmitted wirelessly. In this case, the receiver 110 may receive an audio signal transmitted wirelessly using a Bluetooth or Wi-Fi communication method.

The processor 120 may include one or more processors to control the overall operation of the audio signal processing apparatus 100. For example, the processor 120 may control the operations of the receiver 110 and the output unit 130 by executing at least one program. Furthermore, the processor 120 may perform an operation of the audio signal processing apparatus 100 described with reference to FIGS. 4 to 20 by executing at least one program. For example, the processor 120 may generate an output audio signal. The processor 120 may generate an output audio signal by binaural rendering a reflected sound corresponding to the input audio signal received through the receiver 110. The processor 120 may output the generated output audio signal through the output unit 130 that will be described later.

According to one embodiment, the output audio signal may be a binaural audio signal. For example, the output audio signal may be a two-channel audio signal in which the input audio signal is represented by a virtual sound source located in a three-dimensional space. The processor 120 may perform binaural rendering based on a transfer function pair to be described later. The processor 120 may perform binaural rendering on the time domain or the frequency domain.

According to an embodiment, the processor 120 may generate a two-channel output audio signal by binaural rendering the input audio signal. For example, the processor 120 may generate a two-channel output audio signal corresponding to both ears of listeners, respectively. In this case, the two-channel output audio signal may be a binaural two-channel output audio signal. The processor 120 may generate the audio headphone signal represented on the 3D by performing binaural rendering on the above-described input audio signal.

According to one embodiment, post processing on the output audio signal of the processor 120 may be further performed. Post processing may include crosstalk rejection, dynamic range control (DRC), loudness normalization, peak limiting, and the like. In addition, post processing may include frequency/time domain transform for the output audio signal by the processor 120. The audio signal processing apparatus 100 may include a separate post processing unit that performs the post processing, and according to another embodiment, the post processing unit may be included in the processor 120.

The output unit 130 may output an output audio signal. The output unit 130 may output an output audio signal generated by the processor 120. The output unit 130 may include at least one output channel Here, the output audio signal may be a two-channel output audio signal corresponding to both ears of listeners, respectively. The output audio signal may be a binaural two-channel output audio signal. The output unit 130 may output the 3D audio headphone signal generated by the processor 120.

According to an embodiment, the output unit 130 may include output means for outputting an output audio signal. For example, the output unit 130 may include an output terminal for outputting an output audio signal to the outside. In this case, the audio signal processing apparatus 100 may output an output audio signal to an external device connected to an output terminal. Alternatively, the output unit 130 may include a wireless audio transmission module that outputs an output audio signal to the outside. In this case, the output unit 130 may output an output audio signal to an external device using a wireless communication method such as Bluetooth or Wi-Fi. Alternatively, the output unit 130 may include a speaker. In this case, the audio signal processing apparatus 100 may output an output audio signal through a speaker. In addition, the output unit 130 may further include a converter (e.g., a digital-to-analog converter, DAC) for converting a digital audio signal into an analog audio signal.

Figure 4:
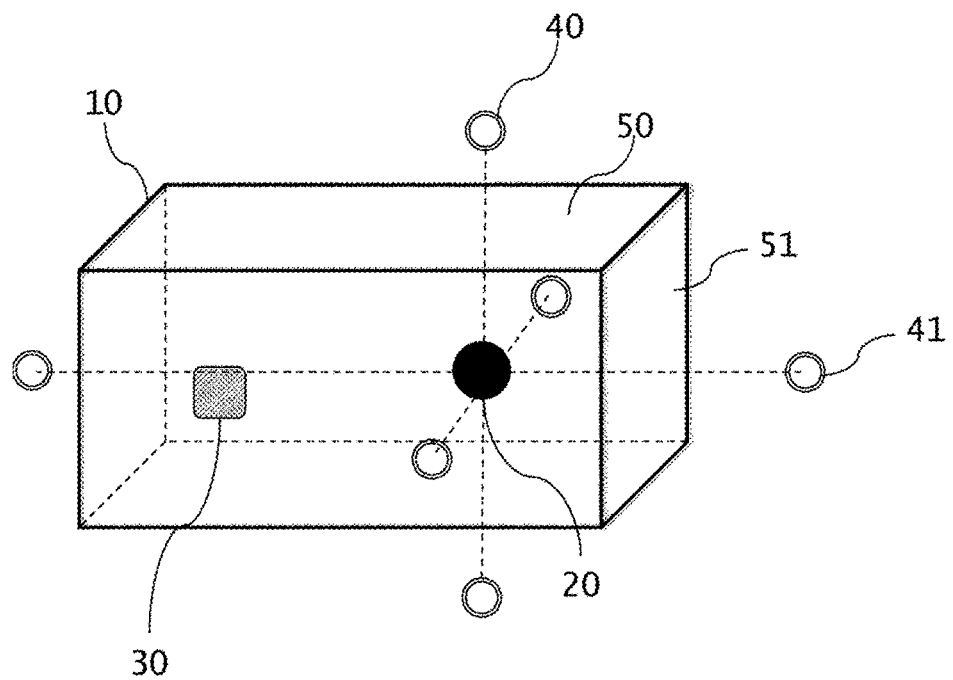
FIG. 4 is a diagram illustrating a virtual space including a virtual sound source, a listener, a virtual reflect sound source, and a mirror plane, according to an embodiment of the present disclosure.

Hereinafter, a method of generating the reflected sound by the audio signal processing apparatus 100 according to the embodiment of the present disclosure will be described with reference to FIG. 4. FIG. 4 is a diagram illustrating a virtual space 10 including a virtual sound source 20, a listener 30, a virtual reflect sound source 40, and a mirror plane 50, according to an embodiment of the present disclosure.

Referring to FIG. 4, the virtual space 10 may include at least one mirror plane 50. In addition, the virtual space 10 may include a virtual sound source 20 and a listener 30 corresponding to the input audio signal. In this case, the audio signal processing apparatus 100 may generate at least one reflected sound corresponding to each of the at least one mirror plane 50 based on the input audio signal. The audio signal processing apparatus 100 may generate at least one reflected sound corresponding to each of the at least one mirror plane 50 based on the location of the virtual sound source 20 corresponding to the input audio signal and spatial information related to the virtual space 10.

According to an embodiment, the audio signal processing apparatus 100 generates at least one reflected sound corresponding to each of the at least one mirror plane 50 by filtering the input audio signal based on the location of the virtual sound source 20 and the spatial information. As described with reference to FIG. 2, the spatial information may include reflectance corresponding to each of the at least one mirror plane 50. In this case, the audio signal processing apparatus 100 may generate at least one reflected sound by filtering the input audio signal based on the reflectance. In detail, the audio signal processing apparatus 100 may generate a first reflected sound by attenuating the level of the input audio signal based on a first reflectance corresponding to a first mirror plane 51. This is because when the sound is reflected on the mirror plane, the mirror plane absorbs the sound, resulting in attenuated the level of the reflected sound.

Also, according to an embodiment, the audio signal processing apparatus 100 may arrange at least one virtual reflect sound source 40 corresponding to each of the at least one reflected sound in the virtual space 10. The audio signal processing apparatus 100 may obtain location information on which each of the at least one virtual reflect sound source 40 is disposed based on the location and spatial information of the virtual sound source 20. The location of the virtual reflect sound source 40 may represent a location in the virtual space 10. In this case, the audio signal processing apparatus 100 may use a reflected sound modeling method. For example, the reflected sound modeling method may include an image source method or ray tracing. For example, the location of the first virtual reflect sound source 41 may be symmetrical with the location of the virtual sound source 20 with respect to the corresponding first mirror plane 51. Referring to FIG. 4, the first virtual reflect sound source 41 and the virtual sound source 20 may be located at the same distance from the first mirror plane 51 on a straight line perpendicular to the first mirror plane 51. However, it is not limited thereto. For example, the reflected sound generated by the reflection of the input audio signal on the plurality of mirror planes 50 may not be symmetrical with the location of the virtual sound source 20 with respect to the mirror plane 50.

According to an embodiment, each of the at least one virtual reflect sound source 40 may be a virtual sound source having different attenuation gains and delays according to the mirror plane 50. In this case, the audio signal processing apparatus 100 may generate at least one reflected sound by filtering the input audio signal based on the attenuation gain and the delay of each of the at least one virtual reflect sound source 40. The attenuation gain and delay may be a value set according to user-defined. Alternatively, the attenuation gain may be specified according to the distance between the virtual sound source and the mirror plane, and the physical characteristics of the mirror plane. The audio signal processing apparatus 100 may determine an attenuation gain corresponding to each of the virtual reflect sound sources 40 based on the above-described reflectance. In addition, the audio signal processing apparatus 100 may obtain an attenuation gain and a delay according to the distance based on the location of the virtual reflect sound source 40 and the location of the listener 30. The audio signal processing apparatus 100 may determine an attenuation gain and a delay corresponding to each of the at least one mirror plane 50 based on the distance between each of the virtual reflect sound source 40 and the listener 30. In addition, the audio signal processing apparatus 100 may generate a reflected sound by filtering the input audio signal based on the attenuation gain and the delay determined by the method described above.

According to an embodiment of the present disclosure, the audio signal processing apparatus 100 may generate an output audio signal based on the relative location of the virtual reflect sound source 40 corresponding to each of the at least one reflected sound. Here, the relative location of the virtual reflect sound source 40 may indicate the location of the virtual reflect sound source with respect to the location and the view-point of the listener 30. The audio signal processing apparatus 100 may obtain the location of the virtual reflect sound source 40 corresponding to each of the at least one reflected sound with respect to the location and the view-point of the listener, based on the location of the virtual reflect sound source 40 and the view-point information of the listener 30. Also, the audio signal processing apparatus 100 may generate an output audio signal by binaural rendering at least one reflected sound based on the relative location of the virtual reflect sound source 40. For example, the audio signal processing apparatus 100 may generate the output audio signal by using a transfer function pair obtained based on a relative location of the virtual reflect sound source 40.

The audio signal processing apparatus 100 may generate the output audio signal by binaural rendering at least one reflected sound in a method including at least one of object binaural rendering, channel binaural rendering, and ambisonic binaural rendering. A method of generating an output audio signal using the object binaural rendering by the audio signal processing apparatus 100 will be described in detail with reference to FIGS. 6 to 10 to be described later. In addition, a method of generating an output audio signal using the channel binaural rendering by the audio signal processing apparatus 100 will be described in detail with reference to FIGS. 11 to 15. In addition, a method in which the audio signal processing apparatus 100 generates an output audio signal using ambisonic binaural rendering will be described in detail with reference to FIGS. 16 to 20 to be described later.

Meanwhile, in the case of a binaural rendered audio signal, the performance of the sound localization that defines the location of the sound incident to the front or rear of the listener may be reduced. For example, the listener may not be able to distinguish the location of a first virtual sound source corresponding to a first audio signal incident to the front of the view-point of the listener and the location of a second virtual sound source corresponding to a second audio signal incident to the rear of the view-point of the listener. This is because the interaural level difference (ILD) and interaural time difference (ITD) of the first audio signal are equal to the ILD and the ITD of the second audio signal. Even in the case of reflection, the same problem may occur in binaural rendering. The audio signal processing apparatus 100 according to an embodiment may generate an output audio signal by modeling frequency characteristics of a transfer function corresponding to each of the at least one reflected sound. Accordingly, the audio signal processing apparatus 100 may efficiently increase the front-rear sound localization performance in terms of calculation amount.

The audio signal processing apparatus 100 according to an embodiment may generate the reflected sound by using an incident angle at which the reflected sound is incident on the listener. This is because the frequency characteristics of the sound incident on the listener may vary depending on the incident angle. For example, the audio signal processing apparatus 100 may obtain a spectral modification filter based on a relative location of a virtual reflect sound source corresponding to each of the at least one reflected sound. Here, the spectral modification filter may be a filter that changes the characteristic of the reflected sound in the frequency domain according to the incident angle at which the reflected sound is incident to the listener. The spectral modification filter may be a filter modeling a predetermined frequency characteristic of the incident sound according to the incident angle of the sound incident to the listener. In this case, the predetermined frequency characteristic may be a characteristic measured by the audio signal processing apparatus 100 or an external device. For example, the spectral modification filter may be a filter modeling a frequency characteristic of a transfer function corresponding to a reflected sound incident at a specific incident angle. The audio signal processing apparatus 100 may obtain a pre-generated spectral modification filter from an external device connected to the audio signal processing apparatus 100. In this case, the audio signal processing apparatus 100 may request a spectral modification filter based on the relative location of the virtual reflect sound source. Also, the audio signal processing apparatus 100 may generate an output audio signal by binaural rendering the at least one reflected sound filtered based on the obtained spectral modification filter.

According to an embodiment, the audio signal processing apparatus 100 may obtain a specific spectral modification filter corresponding to each of a reflected sound group incident to the front and a reflected sound group incident to the back, with respect to a view-point of the listener. The audio signal processing apparatus 100 may obtain a first spectral modification filter corresponding to any one of the incident angles included in the front side based on the view-point of the listener, and a second spectral modification filter corresponding to any one of incident angle included in the rear side of the view-point of the listener. In this case, the audio signal processing apparatus 100 may generate a spectral modification filter corresponding to each of the at least one reflected sound, based on the relative location of the virtual reflect sound source, the first spectral modification filter, and the second spectral modification filter. For example, the second spectral modification filter may be a filter that attenuates the output of the high frequency band compared to the first spectral modification filter. In detail, the first spectral modification filter may be a filter corresponding to the reflected sound incident to the front of the view-point of the listener in the audio signal processing apparatus 100. Also, the second spectral modification filter may be a filter corresponding to a reflected sound incident to a direction of 180-degree with respect to the front side.

For example, the second spectrum altering filter may be a high shelving filter. The high shelving filter may be a filter that attenuates the magnitude of the signal component in the frequency domain higher than the preset frequency based on the preset frequency. When the high-pass shelving filter is applied to the input audio signal, the magnitude of the signal component in a region that the frequency is lower than the predetermined frequency may be kept the same as the input audio signal. This is because the high frequency band of the audio signal incident to the rear side with respect to the view-point of the listener is attenuated due to the influence of the listener's earlobe and pinna. In addition, the first spectral modification filter may be a filter in which the magnitude component is flat in the frequency domain. This is because a particular frequency bands are attenuated relatively less than an audio signal incident to the rear side with respect to the view-point of the listener.

Also, the audio signal processing apparatus 100 may generate a spectral modification filter corresponding to each of at least one reflected sound incident in a direction other than the incident angle corresponding to the first spectral modification filter and the second spectral modification filter. For example, the audio signal processing apparatus 100 may generate a third spectral modification filter by changing the degree to which the second spectral modification filter attenuates a high frequency band. Also, the audio signal processing apparatus 100 may generate an output audio signal by filtering the reflected sound based on the third spectral modification filter. For example, the audio signal processing apparatus 100 may generate the spectral modification filter corresponding to each of the at least one reflected sound by weighted summing the first spectral modification filter and the second spectral modification filter based on the relative location of the virtual reflect sound source.

Specifically, the audio signal processing apparatus 100 may generate a third spectral modification filter by applying a higher weight to the first spectral modification filter compared to the second spectral modification filter when the reflected sound is incident to the front side of the listener according to the relative location of the virtual reflect sound source. On the contrary, when the reflected sound is incident to the rear side of the listener according to the relative location of the virtual reflect sound source, the audio signal processing apparatus 100 may generate a fourth spectral modification filter by applying a higher weight to the second spectral modification filter compared to the first spectral modification filter. In addition, the audio signal processing apparatus 100 may generate an output audio signal by binaural rendering the reflected sound filtered based on the spectral modification filter corresponding to each of the at least one reflected sound. In this case, the energy compensation process may be performed in consideration of an increase in the energy level due to the weighted sum of the spectral modification filters. In the present disclosure, the first spectral modification filter and the second spectral modification filter are described as filters corresponding to reflected sounds incident in front side and rear side, respectively, but the present disclosure is not limited thereto.

According to an embodiment, the audio signal processing apparatus 100 may obtain a plurality of spectral modification filters corresponding to each incident angle within a predetermined range based on a predetermined number of spectral modification filters. For example, the audio signal processing apparatus 100 may group at least one reflected sound into the predetermined number of spectral modification filters according to frequency characteristics. In addition, the audio signal processing apparatus 100 may generate an output audio signal by filtering at least one reflected sound included in each group based on different spectral modification filters for each group.

According to an embodiment, the audio signal processing apparatus 100 may determine whether to apply a spectral modification filter to each of the at least one reflected sound based on the relative location of the virtual reflect sound source. For example, the audio signal processing apparatus 100 may be classified into a first group to which the spectral modification filter is applied and a second group to which the spectral modification filter is not applied. Also, the audio signal processing apparatus 100 may apply the spectral modification filter to at least one reflected sound included in the second group. In this case, the spectral modification filter may be the above-described high shelving filter.

In addition, the audio signal processing apparatus 100 may classify each of the at least one reflected sound included in the second group into subdivision groups. The audio signal processing apparatus 100 may determine a subdivision group for a reflected sound based on the relative location of the virtual reflect sound source corresponding to the reflected sound. Also, the audio signal processing apparatus 100 may determine at least one of the degree of attenuation and the reference frequency of the high shelving filter based on the subdivision group of the reflected sound. The audio signal processing apparatus 100 may generate the output audio signal by binaural rendering the reflected sound filtered based on the determined degree of attenuation and the determined reference frequency.

In addition, the audio signal processing apparatus 100 may classify each of the at least one reflected sound into a third group including the reflected sound incident to the front side of the listener and a fourth group including the reflected sound incident to the rear side of the listener. The audio signal processing apparatus 100 may classify each of the at least one reflected sound into a third group and a fourth group based on the relative location of the virtual reflect sound source. In addition, the audio signal processing apparatus 100 may generate an output audio signal by filtering the reflected sound included in the third group and the reflected sound included in the fourth group based on different filters. In this case, a spectral modification filter corresponding to the third group may be the first spectral modification filter described above. In addition, a spectral modification filter corresponding to the fourth group may be the second spectral modification filter described above.

Figure 5:
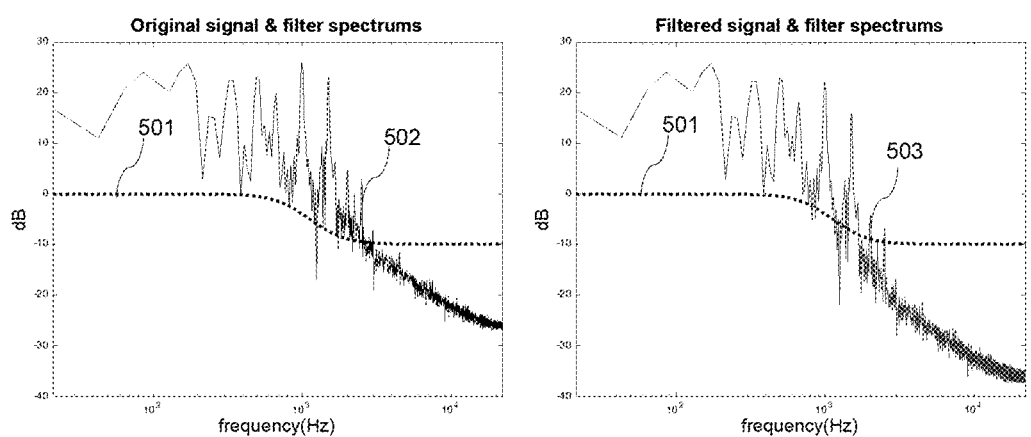
FIG. 5 is a diagram illustrating a filter applied to a reflected sound incident to a rear side of a listener with respect to a view-point of a listener according to an embodiment of the present disclosure.

FIG. 5 is a diagram illustrating a filter applied to a reflected sound incident to a rear side of a listener with respect to a view-point of a listener according to an embodiment of the present disclosure. In FIG. 5, 501 denotes a spectral modification filter 501 corresponding to the reflected sound incident in a direction of 180-degree with respect to the front side of the listener. Also, 502 denotes the spectrum 502 of the reflected sound before applying the spectral modification filter 501, and 503 denotes the spectrum 503 of the reflected sound after applying the spectral modification filter 501. Referring to FIG. 5, in the high frequency region, the magnitude component of the spectrum 503 of the reflected sound is lower than that of the spectrum 502 of the reflected sound before the spectral modification filter 501 is applied. This is because the spectral modification filter 501 used in FIG. 5 represents the high shelving filter described above.

According to an embodiment, the audio signal processing apparatus 100 may apply the same spectral modification filter to the left and right channel signals. In this case, the audio signal processing apparatus 100 may generate an output audio signal by applying the spectral modification filter to an input signal or an output signal of a binaural rendering process. When the binaural feature is precisely applied according to the direction of the virtual reflect sound source, the audio signal processing apparatus 100 may generate an output audio signal based on different spectral modification filters corresponding to each of the left and right channels. According to an embodiment, the audio signal processing apparatus 100 may apply a spectral modification filter to binaural rendered reflected sounds. For example, the binaural rendered reflected sounds may be separated into a left reflected sound signal and a right reflected sound signal corresponding to the both ears of the listener, respectively. In this case, the audio signal processing apparatus 100 may apply different spectral modification filters to each of the left reflected sound signal and the right reflected sound signal. This is because, in the case of the reflected sound incident from the lateral side with respect to the view-point of the listener, the frequency characteristics of the left reflected sound signal and the right reflected sound signal may be different from each other.

Figure 6:
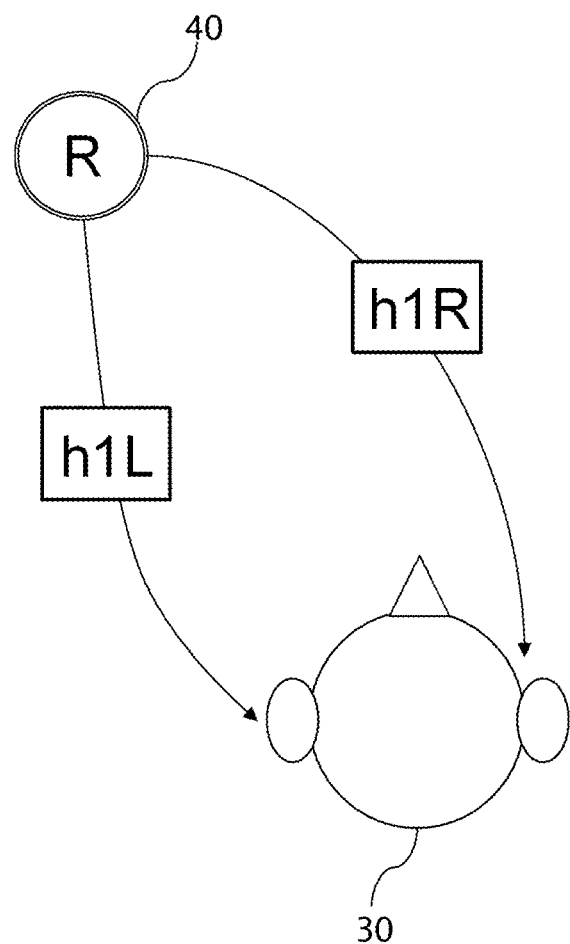
FIG. 6 is a diagram illustrating a relative location of the virtual reflect sound source with respect to the location and the view-point of the listener, according to an embodiment.

FIG. 6 is a diagram illustrating a relative location of the virtual reflect sound source 40 with respect to the location and the view-point of the listener 30, according to an embodiment. Referring to FIG. 6, the acoustic path reaching the left and right ears of the listener 30 from the virtual reflect sound source 40 is determined by the direction and distance of the reflected sound, and the head shadowing effect by the head of the listener. Such a response path may be implemented through a measured transfer function. When the binaural rendering of each reflected sound corresponding to each of the mirror planes is performed using the transfer function pair in the same manner as the direct sound, the amount of calculation is greatly increased according to the number of reflections. This is because when the transfer function pair is used, even when applied in a convolutional form in the time domain or implemented in the frequency domain, the operation of fast Fourier transform/inverse fast Fourier transform (FFT/IFFT) is required. Accordingly, the audio signal processing apparatus 100 may be hard to provide an immersive output audio signal to the listener 30 due to an excessive amount of computation. Also, the audio signal processing apparatus 100 may be hard to provide a change in spatial sound due to a change in locational relationship between the listener 30 and the virtual sound source 20 or a change in the virtual space 10.

The audio signal processing apparatus 100 according to an embodiment of the present disclosure may generate an output audio signal by using a binaural parameter pair obtained based on a transfer function. Here, the binaural parameter pair may include an attenuation gain and delay approximated based on the transfer function. For example, the binaural parameter pair may include ipsilateral binaural parameters and contralateral binaural parameters. In addition, each of the ipsilateral and contralateral binaural parameters may include attenuation gain and delay, respectively. That is, the ipsilateral binaural parameter may include the ipsilateral attenuation gain and the ipsilateral delay, and the contralateral binaural parameter may include the contralateral attenuation gain and the contralateral delay.

As a result, the audio signal processing apparatus 100 may generate the output audio signal by binaural rendering the reflected sound with a smaller amount of computation than when using the transfer function. In addition, the audio signal processing apparatus 100 may generate an output audio signal with less memory consumption than when using the transfer function. Hereinafter, a method of generating an output audio signal using the binaural parameter pair by the audio signal processing apparatus 100 according to an embodiment of the present disclosure will be described with reference to FIG. 7.

Figure 7:
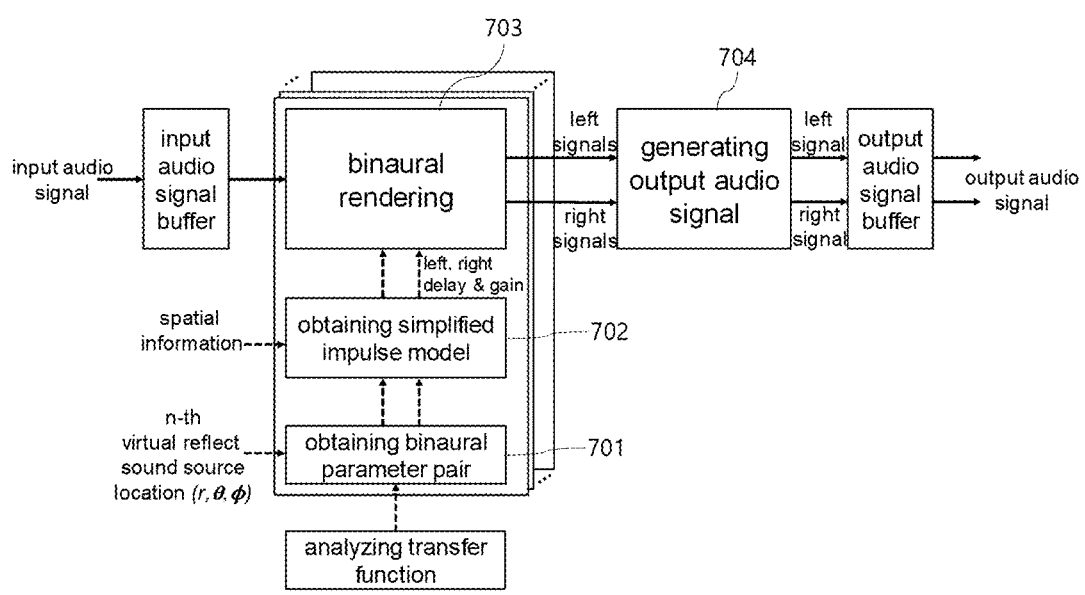
FIG. 7 is a block diagram illustrating a method of generating an output audio signal using a binaural parameter pair by the audio signal processing apparatus according to an embodiment.

FIG. 7 is a block diagram illustrating a method of generating an output audio signal using a binaural parameter pair by the audio signal processing apparatus 100 according to an embodiment. In block 701, the audio signal processing apparatus 100 according to an embodiment of the present disclosure may obtain a binaural parameter pair corresponding to each of the at least one reflected sound based on the transfer function. For example, the audio signal processing apparatus 100 may obtain a transfer function corresponding to each of the at least one reflected sound based on the relative location of the virtual reflect sound source 40. In this case, the audio signal processing apparatus 100 may obtain a relative location of the virtual reflect sound source 40 according to the embodiments described above with reference to FIG. 4. In addition, the transfer function corresponding to a reflected sound may include a transfer function pair corresponding to the reflected sound. Alternatively, the transfer function corresponding to a reflected sound may include one of the transfer function pair and additional parameters for deriving the other one.

In detail, the audio signal processing apparatus 100 may obtain an elevation angle θ and an azimuth φ representing the relative location of the virtual reflect sound source 40 with respect to the view-point of the listener 30. Also, the audio signal processing apparatus 100 may obtain a transfer function corresponding to each of the at least one reflected sound based on the elevation angle and the azimuth angle. For example, the audio signal processing apparatus 100 may receive a transfer function corresponding to each of at least one reflected sound from a database including a plurality of transfer functions. In this case, the audio signal processing apparatus 100 may include a separate communication unit (not shown) that requests the transfer function to a database and receives information on the transfer function from the database. Alternatively, the audio signal processing apparatus 100 may obtain a transfer function corresponding to each of the at least one reflected sound based on the transfer function set stored in the audio signal processing apparatus 100.

Also, the audio signal processing apparatus 100 may obtain a binaural parameter pair corresponding to each of the at least one reflected sound based on at least a portion of the obtained transfer function. For example, the audio signal processing apparatus 100 may obtain a binaural parameter pair based on a mean of magnitude components of the transfer function, but is not limited thereto. For example, the audio signal processing apparatus 100 may obtain a binaural parameter pair based on the median of the magnitude component of the transfer function. Also, the audio signal processing apparatus 100 may use the magnitude component of the transfer function corresponding to specific frequency bins in the frequency domain. Alternatively, the audio signal processing apparatus 100 may obtain a binaural parameter pair based on at least a portion of an impulse response (HRIR) indicating a transfer function in a time domain. For example, the audio signal processing apparatus 100 may use any one of an average value, a median value, a maximum value, or a minimum value in time intervals at least a portion of an impulse response.

According to an embodiment, the audio signal processing apparatus 100 may obtain ipsilateral attenuation gain and contralateral attenuation gain corresponding to each of the at least one reflected sound based on at least a portion of the transfer function and an interaural level difference. Specifically, the audio signal processing apparatus 100 may use the average of the magnitude component of the transfer function as the attenuation gain for either the ipsilateral or contralateral side, and determine the attenuation gain of the other side based on the interaural level difference. For example, the audio signal processing apparatus 100 may obtain a bilateral level difference ILD representing a difference in sound level between the ipsilateral side and contralateral side based on the transfer function. In particular, the bilateral level difference ILD may represent a sound level difference due to head shadowing between the left and right ears of the listener 30. The ILD may be determined based on the ratio of the average energy between an impulse response representing the right transfer function HRIR_R and an impulse response representing the left transfer function HRIR_L, as shown in [Equation 1]. In Equation 1, $E\{X^2\}$ represents the average energy of X. Unlike Equation 1, the interaural level difference may be determined based on the mean and median of the magnitude component for at least a portion of the transfer function.

$$ILD = E\{HRIR\_R[n]^2\} / E\{HRIR\_L[n]^2\} \quad \text{[Equation 1]}$$

According to an embodiment, when the relative location of the first virtual reflect sound source corresponding to the first reflected sound is on the left side of the listener 30, the audio signal processing apparatus 100 may determine the left attenuation gain corresponding to the ipsilateral side based on the left transfer function. Also, the audio signal processing apparatus 100 may determine a right attenuation gain corresponding to the contralateral side based on the left transfer function and the ILD. On the contrary, when the relative location of the second virtual reflect sound source corresponding to the second reflected sound is on the right side of the listener 30, the audio signal processing apparatus 100 may determine the right attenuation gain corresponding to the ipsilateral side based on the right transfer function. Also, the audio signal processing apparatus 100 may determine a left attenuation gain corresponding to the contralateral side based on the right transfer function and the ILD.

According to an embodiment, the audio signal processing apparatus 100 may obtain an ipsilateral delay and a contralateral delay corresponding to each of the at least one reflected sound based on the interaural time difference. For example, the audio signal processing apparatus 100 may obtain an ITD based on a transfer function. Here, the ITD may represent the difference in the time that the sound arrives to each of the ipsilateral and contralateral side of the listener from the same sound source. In detail, the audio signal processing apparatus 100 may determine the ITD based on the ipsilateral transfer function and the contralateral transfer function. In addition, the audio signal processing apparatus 100 may determine the ITD based on the cross-correlation between the left and the right as shown in [Equation 2].

$$ITD = \text{argmax}\_d\{Psi(n,d)\} \quad \text{[Equation 2]}$$

In Equation 2, argmax_d(f(n, d)) may indicate a value of 'd' when f(n, d) is maximum. In addition, Psi(n, d) may indicate a cross-correlation coefficient between the left transfer function HRIR_L and the right transfer function HRIR_R. Psi(n, d) may be calculated as shown in [Equation 3]. In Equation 3, sqrt [x] represents the square root of 'x'.

$$Psi(n,d) = E\{HRIR\_L(n) * HRIR\_R(n-d)\} / \text{sqrt}[E\{HRIR\_L(n)^2\} * E\{HRIR\_R(n)^2\}] \quad \text{[Equation 3]}$$

In Equation 3, $E\{x\}$ represents an average of each n samples of an impulse response HRIR_L representing a left transfer function and an impulse response HRIR_R representing a right transfer function. For example, when the virtual reflect sound source is located in front of the listener 30, the difference in delay time for reaching the listener's ears may be relatively small. In this case, the cross-correlation Psi(n, d) may be a value close to the maximum value 1 when d is zero. In addition, the value d becomes larger or smaller than 0 when the virtual reflect sound source is located on the lateral side of the listener 30, and the value d becomes the interaural time difference when the value of Psi (n, d) has the maximum value.

In block 702, the audio signal processing apparatus 100 according to an embodiment of the present disclosure may obtain a simplified impulse model pair based on the binaural parameter pair obtained in block 701 and spatial information. In this case, the audio signal processing apparatus 100 may generate an output audio signal including at least one reflected sound by binaural rendering the input audio signal based on the simplified impulse model pair. The simplified impulse model pair may include attenuation gain and delay as shown in Equation 4.

$$h1L(n)=a\_L(r,\text{theta},\text{phi})*\text{delta}(n-d\_L(r,\text{theta},\text{phi}))$$

$$h1R(n)=a\_R(r,\text{theta},\text{phi})*\text{delta}(n-d\_R(r,\text{theta},\text{phi}))$$ [Equation 4]

In Equation 4, a_L and a_R represent attenuation gain according to the elevation theta, azimuth phi, and representing the relative location of the virtual reflect sound source 40, and the distance r between the listener 30 and the virtual reflect sound source 40. In addition, d_L and d_R represent a sample delay. In Equation 4, the sample delays d_L and d_R may be determined based on the distance r between the virtual reflect sound source and the listener, and the speed of sound propagation. In addition, in the case of the contralateral delay, a delay due to the difference in time described above may be added. In Equation 4, delta(n) may represent a delta function. In detail, the delta function may be a Kronecker delta function. The Kronecker delta function may include a unit impulse function of size '1' at n=0. a_L and a_R in Equation 4 can be calculated as shown in Equation 5. In Equation 5, sqrt(x) may represent the square root of x.

$$a\_L=g*\text{sqrt}(E\{HRIR\_L^5\})/r$$

$$a\_R=\text{sqrt}(ILD)*a\_L$$

or, $$a\_L=\text{sqrt}(1/ILD)*a\_R$$

$$a\_R=g*\text{sqrt}(E\{HRIR\_R^2\})/r$$ [Equation 5]

In Equation 5, g may represent attenuation gain due to the reflectance of the mirror plane. For example, the attenuation gain g according to the reflectance may be expressed through an integer or a decimal number having a preset range. For example, the attenuation gain g according to the reflectance may have a value between 0 and 1. In this case, as the attenuation gain g according to the reflectance approaches 0, the sound absorption of the mirror plane may be higher. In addition, when the attenuation gain g according to the reflectance is 1, it may represent specular reflection on the mirror plane. When the reflection order is the second order or more, the audio signal processing apparatus 100 may determine the attenuation gain g according to the reflectance by accumulating the reflectance in the form of multiplying. For example, when the reflection order is n-th order and the reflectance is h, the attenuation gain g may be h^n.

Also, the audio signal processing apparatus 100 may determine the attenuation gain based on the distance r between the virtual reflect sound source 40 and the listener 30. For example, the attenuation gain according to the distance may be 1/r. In Equation 5, 1/r may be replaced with the other distance attenuation model. Also, in the case of contralateral attenuation gain, attenuation according to the above-described interaural level difference may be added.

In Equation 5, E{x} represents an expectation of x. As described above, the audio signal processing apparatus 100 may generate a binaural parameter pair based on the expectation of the magnitude of the transfer function HRIR_L or HRIR_R. Also, the audio signal processing apparatus 100 may determine the attenuation gain included in the simplified impulse model based on the binaural parameter.

According to an embodiment, the audio signal processing apparatus 100 may store the generated binaural parameter set in a database. In this case, the database may include an external device connected to the audio signal processing apparatus 100 or a storage inside the audio signal processing apparatus 100. In this case, the audio signal processing apparatus 100 may obtain a binaural parameter set through the database based on the location of the virtual reflect sound source 40 and spatial information.

In block 703, the audio signal processing apparatus 100 may binaural render at least one reflected sound based on the binaural parameter pair to generate a first output audio signal. In this case, the first output audio signal may include an output audio signal obtained by binaural rendering of one of the plurality of reflected sounds. Next, in block 704, the audio signal processing apparatus 100 may generate a second output audio signal by synthesizing plurality of first output audio signals generated in block 703. In this case, the audio signal processing apparatus 100 may generate the second output audio signal by synthesizing the plurality of first output audio signals for each channel. For example, the audio signal processing apparatus 100 may generate the second output audio signal by synthesizing the plurality of first output audio signals for each left/right output channel corresponding to the both ears of the listeners. Also, the second output audio signal may include direct sound, early reflections, and late reverberation.

Meanwhile, according to an embodiment of the present disclosure, when the virtual space in which the listener listens to the sound source is changed, the characteristics of the spatial sound may be changed. When the locational relationship between the virtual sound source corresponding to the input audio signal and the listener is changed, the characteristics of the spatial sound may be changed. Hereinafter, a method of applying the updated binaural parameter pair based on the change in the locational relationship between the virtual sound source and the listener, according to an embodiment of the present disclosure, will be described with reference to FIGS. 8 to 10.

Figure 8:
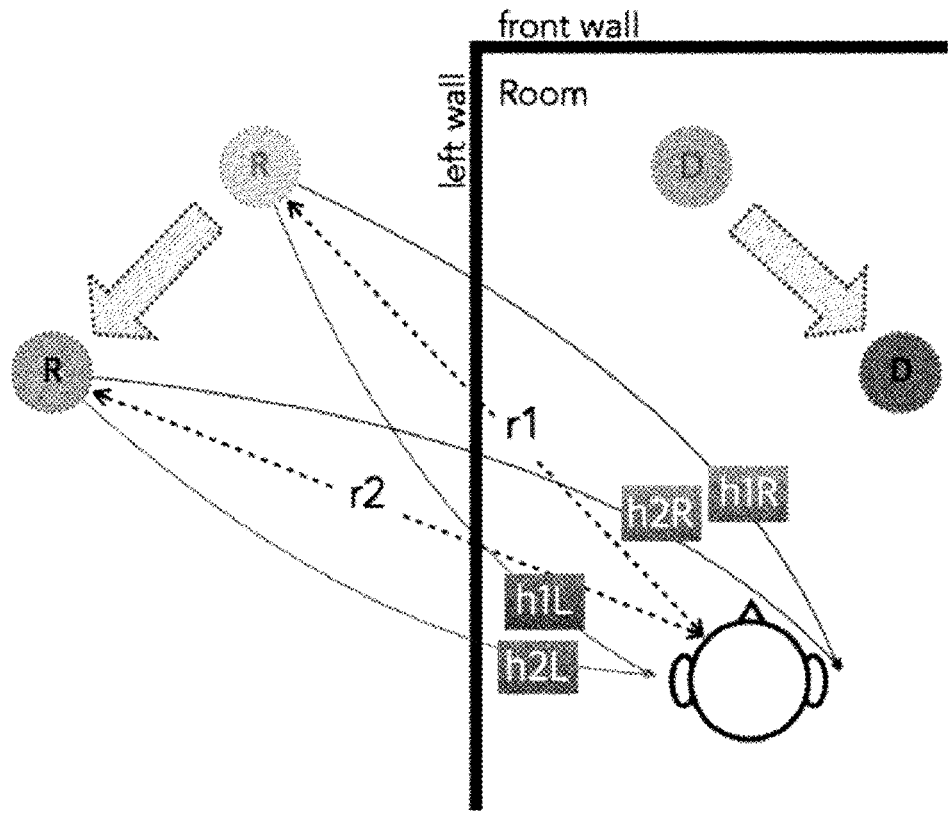
FIG. 8 is a diagram illustrating a case where a virtual sound source corresponding to an input audio signal moves in a virtual space, according to an embodiment of the present disclosure.

FIG. 8 is a diagram illustrating a case where a virtual sound source corresponding to an input audio signal moves in a virtual space, according to an embodiment of the present disclosure. Referring to FIG. 8, when a direct sound D representing a virtual sound source corresponding to the input audio signal is moved in the virtual space, the location of a reflected sound R representing a virtual reflect sound source corresponding to a mirror plane left wall is moved. Accordingly, the audio signal processing apparatus 100 may update the binaural parameter pair applied to the reflected sound R. In addition, the audio signal processing apparatus 100 may update the first simplified impulse model pair h1L (n), h1R (n) calculated in Equation 2 to the second simplified impulse model pair h2L (n), h2R (n).

Figure 9:
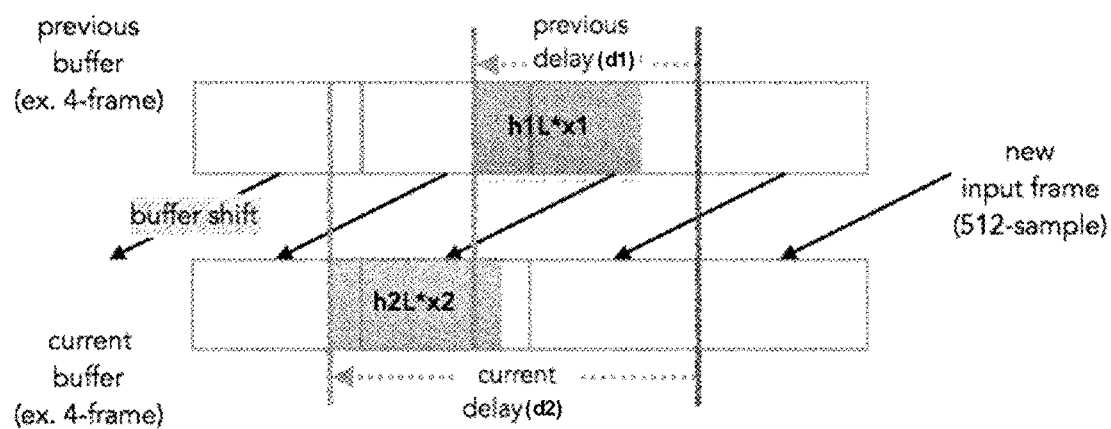
FIG. 9 is a diagram illustrating an operation of a buffer of the audio signal processing apparatus according to an embodiment of the present disclosure.

FIG. 9 is a diagram illustrating an operation of a buffer of the audio signal processing apparatus 100 according to an embodiment of the present disclosure. The audio signal processing apparatus 100 may generate a reflected sound corresponding to the input audio signal by using an input buffer that stores the input audio signal. When the locational relationship between the listener and the virtual sound source corresponding to the input audio signal changes, the response path from which the reflected sound reaches the listener from the virtual reflected sound source may change. In this case, the audio signal processing apparatus 100 may update the binaural parameter pair as described above with reference to FIG. 8. In addition, the audio signal processing apparatus 100 may update the reflected sound. Also, according to the update of the binaural parameter pair and the reflected sound, the buffer index corresponding to the reflected sound may be changed. Here, the buffer index may be an index indicating a location of each sample included in the input audio signal in the input buffer.

FIG. 9 shows the difference in the delay of the audio signal reaching the left (L) ear of the listener 30 when the response path changes from h1 to h2 in the previous buffer and the current buffer. FIG. 9 illustrates an embodiment in which an input audio signal is rendered and buffer shifted, in units of frame. The audio signal processing apparatus 100 may obtain a buffer index in the input buffer corresponding to the at least one reflected sound based on the delay. Here, the delay may include an ipsilateral delay and a contralateral delay included in the binaural parameter pair, and a delay according to the location of the virtual reflect sound source. In FIG. 9, the audio signal processing apparatus 100 may generate a reflected sound corresponding to an input audio signal frame at each time, based on each of the previous delay d1 in the previous buffer and the current delay d2 in the current buffer. In this case, the buffer index to which the binaural parameter pair is applied in the input buffer may not coincide with the start point of the frame as shown in FIG. 9. The audio signal processing apparatus 100 may apply a binaural parameter pair on a sample basis in the input buffer. The number of input audio signal samples to which the attenuation gain corresponding to one reflected sound is applied in the input buffer may be different from the number of input audio signal samples included in one frame. Also, the audio signal processing apparatus 100 may determine the length of the input buffer based on at least one of spatial information, reference reflection order, performance of a processor, and user input related to a reproduction degree of spatial sound.

According to an embodiment, the audio signal processing apparatus 100 may generate the reflected sound after the locational relationship between the listener and the virtual sound source is changed, based on the reflected sound and binaural parameter pairs before the locational relationship between the listener and the virtual sound source is changed. Referring to FIG. 9, the audio signal processing apparatus 100 may generate a reflected sound corresponding to a current input audio signal frame based on a previous delay d1 in a previous buffer and a current delay d2 in a current buffer.

The audio signal processing apparatus 100 may apply fade-in-out to each of a first set of reflected sounds to which the binaural parameter pair calculated in the previous buffer is applied and a second set of reflected sounds to which the updated binaural parameter pair is applied. The audio signal processing apparatus 100 may generate the reflected sound corresponding to the current frame by using a sample of the input audio signal corresponding to the buffer index determined based on the delay, before updating, in the current buffer. Also, the audio signal processing apparatus 100 may generate the reflected sound corresponding to the current frame by using a sample of the input audio signal corresponding to the buffer index determined based on the delay updated in the previous buffer. In this way, the audio signal processing apparatus 100 may prevent the discontinuity between the first set of reflected sounds and the second set of reflected sounds. This can be effectively applied in an audio signal processing system operating in units of buffer.

Figure 10:
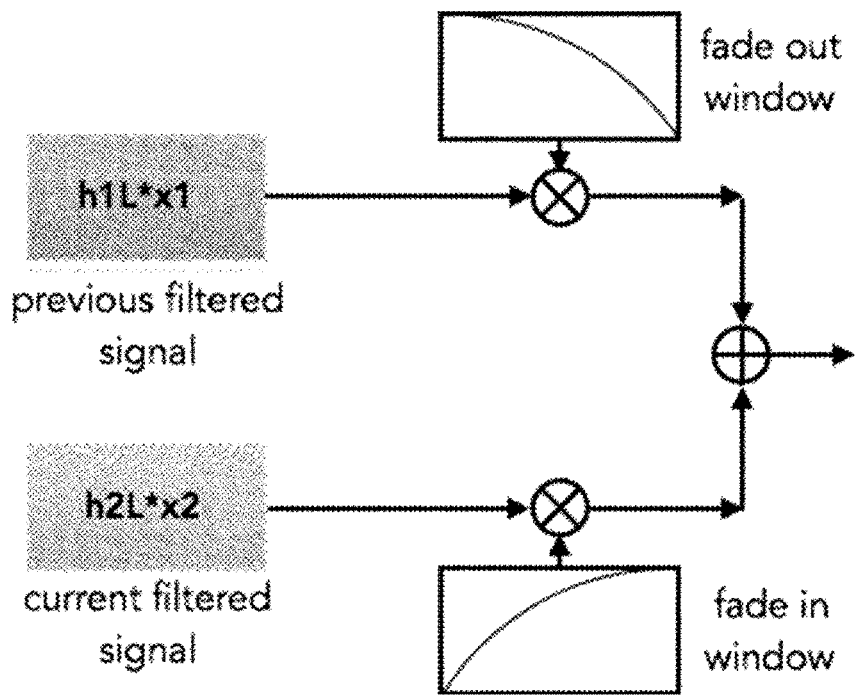
FIG. 10 is a diagram illustrating a method of applying fading by an audio signal processing apparatus according to an embodiment.

FIG. 10 is a diagram illustrating a method of applying fading by an audio signal processing apparatus 100 according to an embodiment. The audio signal processing apparatus 100 may obtain the updated binaural parameter pair corresponding to each of the at least one updated reflected sound and the at least one updated reflected sound based on the change in the locational relationship between the virtual sound source and the listener. In this case, the change in the locational relationship between the virtual sound source and the listener may include at least one of the movement of the virtual sound source, the movement of the listener, and the movement of the view-point of the listener. In addition, the audio signal processing apparatus 100 generates an output audio signal by applying a fade-out window to the first set of reflected sounds and a fade-in window to the second set of reflected sounds. Here, the fade out window may indicate a filter that changes the level of the reflected sound included in the window from a preset maximum value to a preset minimum value over time. In this case, the window may include a preset time interval. For example, the fade out window may include a filter that reduces the output gain of the reflected sound from a preset maximum value to a preset minimum value for a preset time. Also, the fade in window may represent a filter for changing the level of the reflected sound included in the window from a preset minimum value to a preset maximum value according to time. For example, the fade in window may include a filter that increases the output gain of the reflected sound from the preset minimum value to the preset maximum value for a preset time. In this case, the shape of the curve of the fade out window and the fade in window is not limited to the form shown in FIG. 10. For example, the curve shape of the fade out window and the fade in window may be in the form of a roll-off curve according to the derivative of the window. In addition, the preset maximum value may be greater than the preset minimum value.

Meanwhile, the audio signal processing apparatus 100 may perform a binaural rendering operation by using different transfer function pairs as many as the number of virtual reflect sound sources. In this case, as the number of virtual reflect sound sources increases, the amount of calculation of the audio signal processing apparatus 100 may increase. In addition, when the locational relationship between the listener 30 and the virtual sound source 20 is changed or the virtual space is changed, the audio signal processing apparatus 100 may need to acquire a new transfer function pair. The audio signal processing apparatus 100 according to another embodiment of the present disclosure may binaural render the reflected sound by using a virtual channel fixed based on the view-point of the listener 30. In this way, the audio signal processing apparatus 100 may generate various numbers of reflected sounds by using a predetermined number of transfer functions. Hereinafter, a method in which the audio signal processing apparatus 100 generates an output audio signal using channel binaural rendering will be described with reference to FIGS. 11 through 15.

Figure 11:
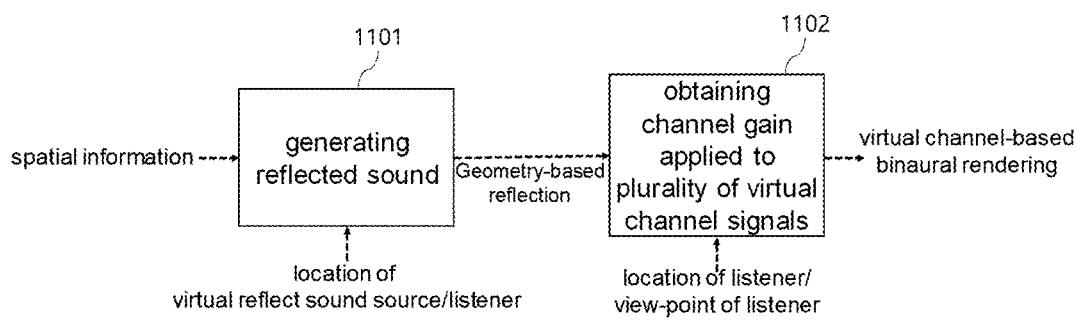
FIG. 11 is a block diagram illustrating a process of generating an output audio signal by using a virtual channel by the audio signal processing apparatus according to an embodiment.

FIG. 11 is a block diagram illustrating a process of generating an output audio signal by using a virtual channel by the audio signal processing apparatus 100 according to an embodiment. In block 1101 of FIG. 11, the audio signal processing apparatus 100 may generate at least one reflected sound based on the location of the virtual sound source 20 and the spatial information related to the virtual space. In addition, the audio signal processing apparatus 100 may determine the location of the virtual reflect sound source corresponding to each of the at least one reflected sound based on the location of the virtual sound source 20 and the spatial information. In block 1101, the method described in FIG. 4 may be applied to the method in which the audio signal processing apparatus 100 generates the reflected sound.

In block 1102 of FIG. 11, the audio signal processing apparatus 100 may generate a plurality of virtual channel signals including each of the at least one reflected sound based on the relative location of the virtual reflect sound source corresponding to each of the at least one reflected sound. Here, the plurality of virtual channel signals may be audio signals corresponding to each of the plurality of virtual channels. In addition, the plurality of virtual channels may represent a virtual speaker fixed at a specific location with respect to the view-point of the listener. For example, the audio signal processing apparatus 100 may arrange a plurality of virtual channels based on the view-point of the listener. A method of arranging a virtual channel by the audio signal processing apparatus 100 will be described in detail with reference to FIG. 12. Also, the audio signal processing apparatus 100 may convert one reflected sound into a plurality of virtual channel signals corresponding to each of the plurality of virtual channels. Meanwhile, as described above, the relative location of the virtual reflect sound source may be a relative location of the virtual reflect sound source with respect to the location and the view-point of the listener. The audio signal processing apparatus 100 may obtain a relative location of the virtual reflect sound source based on the view-point of the listener and the location of the virtual reflect sound source.

According to an embodiment, the audio signal processing apparatus 100 may generate virtual channel signals corresponding to each of the plurality of virtual channels based on channel gains corresponding to each of the plurality of virtual channels. For example, the audio signal processing apparatus 100 may determine a plurality of channel gains corresponding to each of the plurality of virtual channels based on the relative location of the virtual reflect sound source and locations of the plurality of virtual channels. In detail, the audio signal processing apparatus 100 may determine channel gains corresponding to each of the plurality of virtual channels for each reflected sound. The audio signal processing apparatus 100 may determine a channel gain corresponding to each of the plurality of virtual channels for each reflected sound by using a vector base amplitude panning (VBAP) method. The vector-based size panning method may be a method of generating a sense of direction and distance of a sound source by using relative location information of a virtual reflect sound source. In addition, the audio signal processing apparatus 100 may generate a virtual channel signal corresponding to each of the plurality of virtual channels by applying the channel gain determined for each reflected sound to each reflected sound. Through the above-described method, the audio signal processing apparatus 100 may convert at least one reflected sound into a virtual channel signal corresponding to each of the plurality of virtual channels based on the channel gains.

According to an embodiment, the audio signal processing apparatus 100 may determine at least one virtual channel used to represent the reflected sound among the plurality of virtual channels for each reflected sound. For example, the audio signal processing apparatus 100 may represent a first reflected sound using a first virtual channel and a second virtual channel. In this case, the audio signal processing apparatus 100 may obtain a first channel gain and a second channel gain corresponding to each of the first virtual channel and the second virtual channel, based on the relative locations of the virtual reflect sound sources corresponding to the first reflected sound. The audio signal processing apparatus 100 may generate the first virtual channel by applying the first channel gain to the first reflected sound. Also, the audio signal processing apparatus 100 may generate the second virtual channel by applying the second channel gain to the first reflected sound.

Thereafter, the audio signal processing apparatus 100 may obtain transfer functions corresponding to each of the plurality of virtual channels based on the location of each of the plurality of the virtual channels with respect to the listener. In this case, the transfer functions corresponding to any one of the plurality of virtual channels may include a transfer function pair corresponding to one virtual channel. Alternatively, the transfer functions corresponding to any one of the plurality of virtual channels may include a transfer function from among a pair of transfer functions and additional parameters for deriving the other transfer function. The audio signal processing apparatus 100 may generate the output audio signal including the reflected sound by binaural rendering the virtual channel signal based on transfer functions corresponding to each of the plurality of virtual channels.

Figure 12:
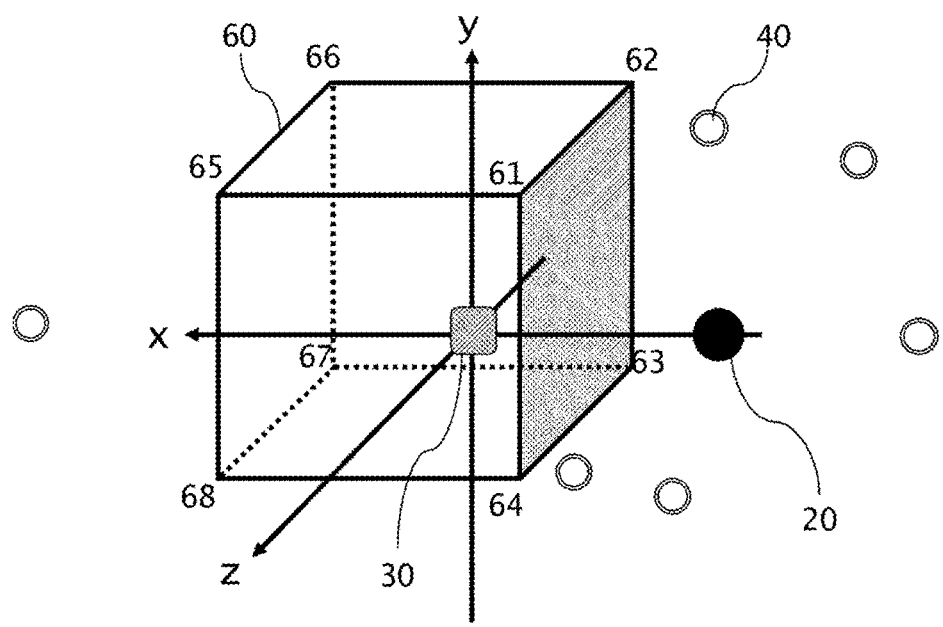
FIG. 12 is a diagram illustrating a plurality of virtual channels arranged with respect to the view-point of the listener in the virtual space, according to an embodiment.

FIG. 12 is a diagram illustrating a plurality of virtual channels 61-68 arranged with respect to the view-point of the listener 30 in the virtual space 10, according to an embodiment. FIG. 12 is only an embodiment of a virtual channel, and the number and arrangement of the virtual channels are not limited to FIG. 12. The virtual channel may represent a virtual speaker. The audio signal processing apparatus 100 may provide a reflected sound to the listener by using at least one virtual channel among the plurality of virtual channels 61-68. In detail, the audio signal processing apparatus 100 may obtain a channel gain corresponding to each of the plurality of virtual channels 61-68 for each reflected sound.

According to an embodiment, the audio signal processing apparatus 100 may determine the locations of each of the plurality of virtual channels based on the location of the virtual sound source 20 and the spatial information related to the virtual space 10. For example, the audio signal processing apparatus 100 may obtain a distribution of a plurality of reflected sounds based on the location of the virtual sound source 20 and the spatial information related to the virtual space 10. Also, the audio signal processing apparatus 100 may determine locations of each of the plurality of virtual channels based on the distribution of the plurality of reflected sounds. For example, the audio signal processing apparatus 100 may arrange a large number of virtual channels in the virtual space 10 adjacent to a region where the number of reflected sounds is large. In detail, the audio signal processing apparatus 100 may divide the virtual space 10 into the number of preset regions. Also, the audio signal processing apparatus 100 may determine the number of virtual channels allocated to each of the divided regions based on the number of the preset regions and the number of the preset virtual channels. In this case, the audio signal processing apparatus 100 may determine the number of reflected sounds based on mirror planes corresponding to each of the divided regions. The audio signal processing apparatus 100 may further determine the number of virtual channels allocated to each divided region based on at least one of the number of reflected sounds corresponding to each of the divided regions, the number of the preset regions, and the number of the preset virtual channels.

Figure 13:
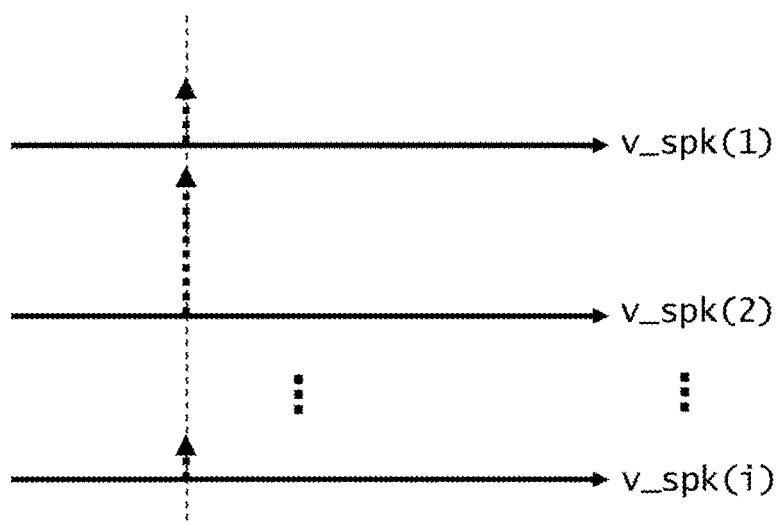
FIG. 13 is a diagram illustrating one reflected sound converted into a virtual channel signal according to an embodiment of the present disclosure.
Figure 14:
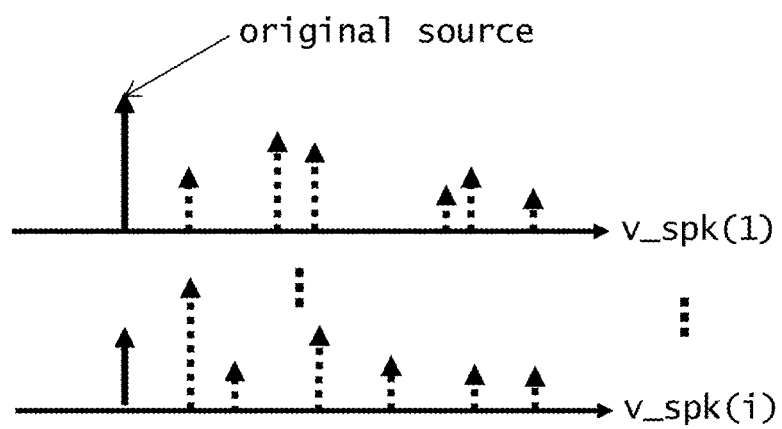
FIG. 14 is a diagram illustrating a plurality of reflected sounds converted into a virtual channel signal according to an embodiment of the present disclosure.

FIG. 13 is a diagram illustrating one reflected sound converted into a virtual channel signal according to an embodiment of the present disclosure. Referring to FIG. 13, the audio signal processing apparatus 100 may convert one reflected sound into a virtual channel signal based on channel gains corresponding to each of the plurality of virtual channels. In FIG. 13, v_spk(1), . . . , v_spk(i) represent i virtual channels, and dashed arrows indicate reflected sounds in the time domain to which different channel gains are applied. FIG. 14 is a diagram illustrating a plurality of reflected sounds converted into a virtual channel signal according to an embodiment of the present disclosure. In FIG. 14, solid arrows indicate direct sounds converted into the plurality of virtual channel signals. In addition, the dashed arrow indicates the reflected sounds in the time domain to which different channel gains are applied for each reflected sounds.

Figure 15:
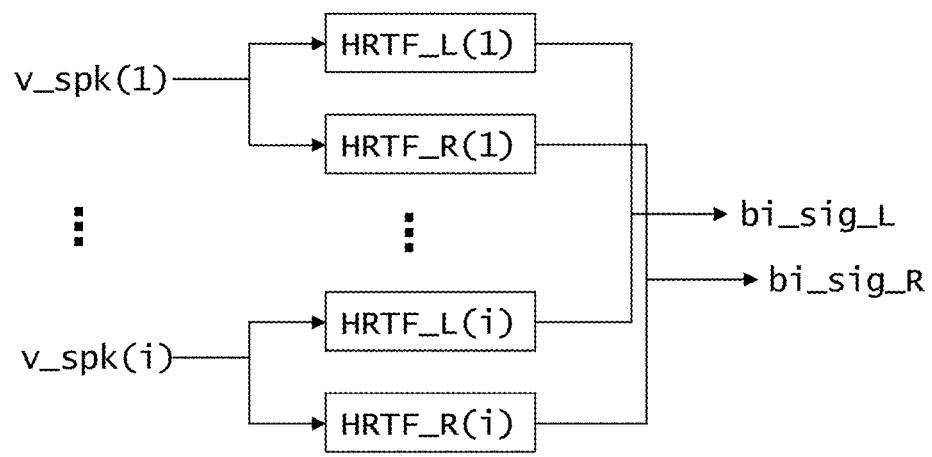
FIG. 15 is a diagram illustrating a process of applying a transfer function for each virtual channel signal according to an embodiment of the present disclosure.

FIG. 15 is a diagram illustrating a process of applying a transfer function for each virtual channel signal according to an embodiment of the present disclosure. In FIG. 15, v_spk (1), . . . , v_spk (i) represent i virtual channels. In addition, HRTF_L (1), . . . , HRTF_L (i) represents left transfer functions obtained based on the location of each of the i virtual channels. In addition, HRTF_R (1), . . . , HRTF_R (i) represents right transfer functions obtained based on the location of each of the i virtual channels. The audio signal processing apparatus 100 may generate output audio signals bi_sig_L and bi_sig_R by binaural rendering the virtual channel signal based on transfer functions corresponding to each of the plurality of virtual channels. As described above, since the location of each of the plurality of virtual channels are set at the initializing of the system, the transfer functions corresponding to each of the plurality of virtual channels are used as same thing even when the view-point of the listener or the locational relationship between the virtual sound source and the listener is changed. Accordingly, when the number of virtual channels increases, the amount of calculation of the audio signal processing apparatus 100 may increase. However, the audio signal processing apparatus 100 does not need to store the number of transfer functions exceeding the number of virtual channels, thereby reducing the memory usage. In addition, even when the number of reflected sounds increases, the amount of system calculations used by the audio signal processing apparatus 100 to apply the transfer functions to the generated reflected sounds may not increase.

On the other hand, when the view-point of the listener or the locational relationship between the listener and the virtual sound source is changed, the channel gain corresponding to each of the plurality of virtual channels may vary. The audio signal processing apparatus 100 may update channel gains corresponding to each of the plurality of virtual channels whenever the view-point of the listener or the locational relationship between the listener and the virtual sound source is changed.

According to an embodiment, the audio signal processing apparatus 100 may update the view-point of the listener based on head movement information of the listener. The listener's head movement information may include rotation angle values in a yaw, pitch, and roll direction according to the rotation axis direction. In this case, the audio signal processing apparatus 100 may obtain rotation angle values in the yaw, pitch, and roll directions from the sensor. Also, the audio signal processing apparatus 100 may rotate the virtual reflect sound source corresponding to each of the at least one reflected sound based on the rotation angle values in the yaw, pitch, and roll directions. The audio signal processing apparatus 100 may update the relative location of the virtual reflect sound source according to Equation 6. Also, the audio signal processing apparatus 100 may update channel gains corresponding to each of the plurality of virtual channels based on the relative location of the updated virtual reflected sound source.

$$[x\_new, y\_new, z\_new]T = [x\_old, y\_old, z\_old]TR\_matrix \quad \text{[Equation 6]}$$

Where R_matrix=R_yaw R_pitch R_roll and $R\_yaw = [\cos(yaw*pi/180) -\sin(yaw*pi/180) 0;$ $\sin(yaw*pi/180) \cos(yaw*pi/180) 0;$ $0\ 0\ 1],$ $R\_pitch = [\cos(pitch*pi/180) 0 -\sin(pitch*pi/180);$ $0\ 1\ 0;$ $\sin(pitch*pi/180) 0 \cos(pitch*pi/180)],$ $R\_roll = [1\ 0\ 0;$ $0 \cos(roll*pi/180) -\sin(roll*pi/180);$ $0 \sin(roll*pi/180) \cos(roll*pi/180)].$ In Equation 6, [x]T represents the transpose matrix of the matrix [x], and pi represents the circular constant. R_matrix represents a 3×3 matrix obtained by matrix multiplication of R_yaw, R_pitch, and R_roll. The audio signal processing apparatus 100 may obtain R_matrix based on the head movement information (yaw, pitch, roll) of the listener. Also, the audio signal processing apparatus 100 may update the view-point of the listener based on the R_matrix to the view-points x_new, y_new, and z_new updated from the existing view-points x_old, y_old, and z_old.

Meanwhile, in the case where the virtual space 10 is assumed to be a cuboid space and binaural rendering a reflected sound having the first order as the reflection order, the amount of calculation of the audio signal processing apparatus 100 is 7 times larger than that of the binaural rendering an input audio signal. This is because the audio signal processing apparatus 100 performs binaural rendering for each of the direct sound and the reflected sounds according to the six mirror planes. Accordingly, the amount of calculation of the audio signal processing apparatus 100 may be increased in proportion to the number of virtual reflect sound sources that are the objects of binaural rendering. The audio signal processing apparatus 100 according to another embodiment may generate an output audio signal by converting at least one reflected sound into an ambisonic signal. In this way, the audio signal processing apparatus 100 may generate an output audio signal reflecting a change in the view-point or location of the listener by using a preset number of ambisonic signals even when the number of virtual reflect sound sources increases. In addition, the audio signal processing apparatus 100 may compress and transmit a plurality of reflected sounds to efficiently output an output audio signal through an external or internal output unit of the audio signal processing apparatus 100.

According to an embodiment, the first order reflected sound generated by one audio signal in a cuboid space may be expressed as shown in Equation 7.

$$\text{reflections} = \text{sum}(n=1 \text{ to } 6)\{\text{alpha}\_n * s[n-t\_dn, \text{theta}\_n, \text{phi}\_n]\} \quad \text{[Equation 7]}$$

In Equation 7, reflections represents a reflected sound obtained by combining a plurality of reflected sounds having a reflection order of 1 in a virtual space including six mirror planes. In addition, sum(n=1 to 6){x} represents the sum of x from n=1 to n=6. In this case, n may be an integer between 1 and 6. alpha_n represents the attenuation gain of the n-th reflected sound, and t_dn represents the delay of the n-th reflected sound. theta_n and phi_n represent elevation angles and azimuths indicating relative location of the virtual reflect sound source corresponding to the n-th reflected sound with respect to the listener.

Figure 16:
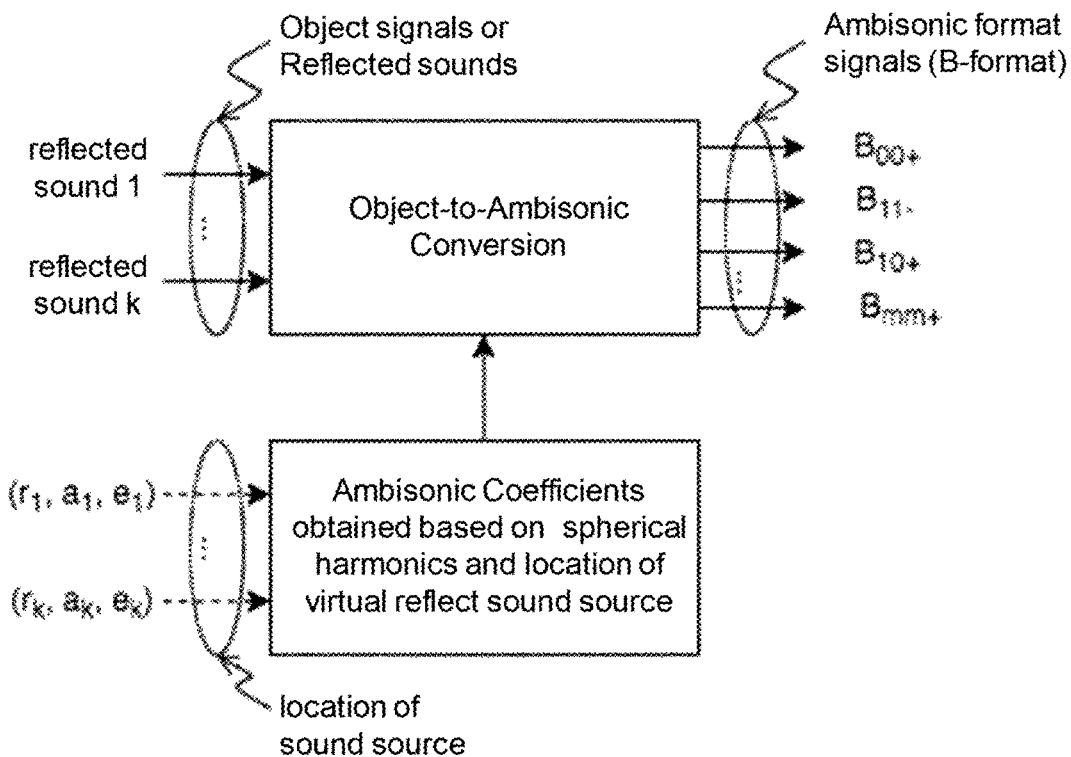
FIG. 16 illustrates a process of converting an object signal into an ambisonic signal by the audio signal processing apparatus according to an embodiment of the present disclosure.

FIG. 16 illustrates a process of converting an object signal into an ambisonic signal by the audio signal processing apparatus 100 according to an embodiment of the present disclosure. Referring to FIG. 16, the audio signal processing apparatus 100 may convert the synthesized reflected sound of Equation 7 into an ambisonic signal. Here, the ambisonics signal is an audio signal capable of acquiring, converting, and reproducing a 360-degree spatial signal through a B-format. The B-format signal represents an ambisonic signal. For example, the audio signal processing apparatus 100 may obtain an ambisonic signal including a predetermined number of signal components of signals in all directions in 360-degree using O2B conversion. Here, O2B conversion means conversion from an object signal to a B-format signal. In FIG. 16, the reflected sounds 1 to k may be at least one reflected sound generated through the embodiments described with reference to FIG. 4. In addition, B00+, B11−, B10+, . . . , Bmm may represent the m-th order ambisonic format signal, respectively. In this case, the m-th order ambisonic format signal may include (m+1)^2 signal components. In addition, (r1, a1, e1), . . . , (rk, ak, ek) may indicate a relative location of the virtual reflect sound source corresponding to each of the k reflected sounds.

According to an embodiment, the audio signal processing apparatus 100 may include location information indicating a relative location of a virtual reflect sound source corresponding to each of the at least one reflected sound and a basis of m-th order spherical harmonics. At least one reflected sound may be converted into m-th order ambisonic signals. For example, as shown in FIG. 16, the audio signal processing apparatus 100 may obtain ambisonic coefficients based on location information indicating a relative location of a virtual reflect sound source and a basis of an m-th order spherical harmonics. Also, the audio signal processing apparatus 100 may convert at least one reflected sound into an m-th order ambisonic signals based on the obtained ambisonic coefficients. In detail, each of the at least one reflected sound may be converted into an ambisonic signal through Equation 8, before being synthesized as shown in Equation 7. The audio signal processing apparatus 100 may convert the plurality of reflected sounds into the m-th order ambisonic signals based on the location of the virtual reflect sound source corresponding to each of the plurality of reflected sounds and the basis of the m-th order spherical harmonics.

$$\text{reflection\_amb} = \text{sum}(n=1 \text{ to } 6)\{\text{alpha}\_n * s[n-t\_dn] * Y(m, \text{theta}\_n, \text{phi}\_n)\} \quad \text{[Equation 8]}$$

In Equation 8, Y(m, theta_n, phi_n) represents the basis of the m-th order spherical harmonics based on the elevation angle theta_n and the azimuth angle phi_n of the n-th reflected sound. In this case, the basis of the m-th order spherical harmonics may further include additional coefficients to maintain the energy of each of the reflected sounds. Equation 7 and Equation 8 are examples of the first order reflected sound for the cuboid space and the corresponding ambisonic signal, respectively, the equations are not limited thereto and may vary according to the virtual space and the ambisonic order.

In addition, the audio signal processing apparatus 100 may generate an output audio signal by binaural rendering the m-th order ambisonic signals. For example, the audio signal processing apparatus 100 may binaural render the m-th order ambisonic signals based on the conversion information of the m-th order ambisonic signals. Alternatively, the audio signal processing apparatus 100 may convert the m-th order ambisonic signals into virtual channel signals, and binaural render the converted virtual channel signals. In detail, the audio signal processing apparatus 100 may convert the m-th order ambisonic signals into virtual channel signals corresponding to each of the plurality of virtual channels arranged with respect to the view-point of the listener. In this case, the plurality of virtual channels may refer to the virtual channels described with reference to FIGS. 11 and 12. In addition, the audio signal processing apparatus 100 may generate an output audio signal by binaural rendering the virtual channel signal based on transfer functions corresponding to each of the plurality of virtual channels. In this case, the embodiments described with reference to FIGS. 11 to 15 may be applied to the method for generating an output audio signal by the audio signal processing apparatus 100.

Figure 17:
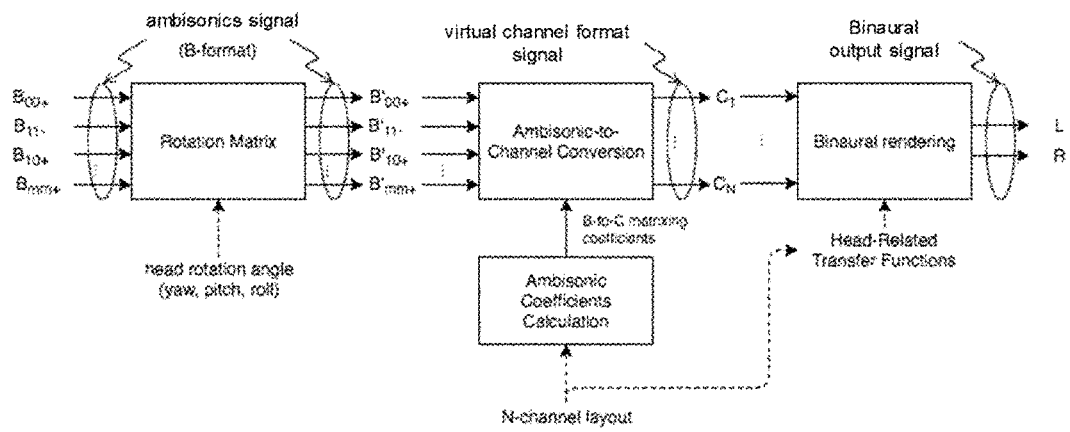
FIG. 17 is a diagram illustrating a process of generating an output audio signal by binaural rendering an ambisonic signal by the audio signal processing apparatus according to an embodiment of the present disclosure.

FIG. 17 is a diagram illustrating a process of generating an output audio signal by binaural rendering an ambisonic signal by the audio signal processing apparatus 100 according to an embodiment of the present disclosure. Referring to FIG. 17, according to an embodiment, the audio signal processing apparatus 100 may convert a first m-th order ambisonic signals B00+, B11−, B10+, . . . , Bmm into a second m-th order ambisonic signals B00+', B11−', B10+', . . . , Bmm'. For example, after the first m-th order ambisonic signal is generated, the audio signal processing apparatus 100 may obtain the head movement information of the listener. The audio signal processing apparatus 100 may update the view-point of the listener based on the head movement information of the listener. In this case, the audio signal processing apparatus 100 may generate the second m-th order ambisonic signal by rotating the first m-th order ambisonic signal, based on the updated view-point of the listener and the rotation matrix. Accordingly, the audio signal processing apparatus 100 may reduce the amount of computation required to update the relative locations of each of the plurality of reflected sounds based on the updated view-point of the listener.

In addition, the audio signal processing apparatus 100 may convert the second m-th order ambisonic signal into a virtual channel signal corresponding to each of the plurality of virtual channels arranged based on the view-point of the listener. In this case, the plurality of virtual channels may refer to the virtual channels described with reference to FIGS. 11 and 12. The audio signal processing apparatus 100 may obtain a B-to-C ambisonic coefficients for converting the ambisonic signals into channel signals based on the location information of each of the plurality of virtual channels arranged based on the listener. Also, the audio signal processing apparatus 100 may convert the second m-th order ambisonic signal into virtual channel signals C1-CN corresponding to each of the plurality of virtual channels based on B-to-C ambisonic coefficients. Also, the audio signal processing apparatus 100 may generate an output audio signal by binaural rendering the virtual channel signals C1 to CN based on the transfer functions corresponding to each of the plurality of virtual channels. In this case, the embodiments described with reference to FIGS. 11 to 15 may be applied to the method for generating the output audio signals L and R by the audio signal processing apparatus 100.

Figure 18:
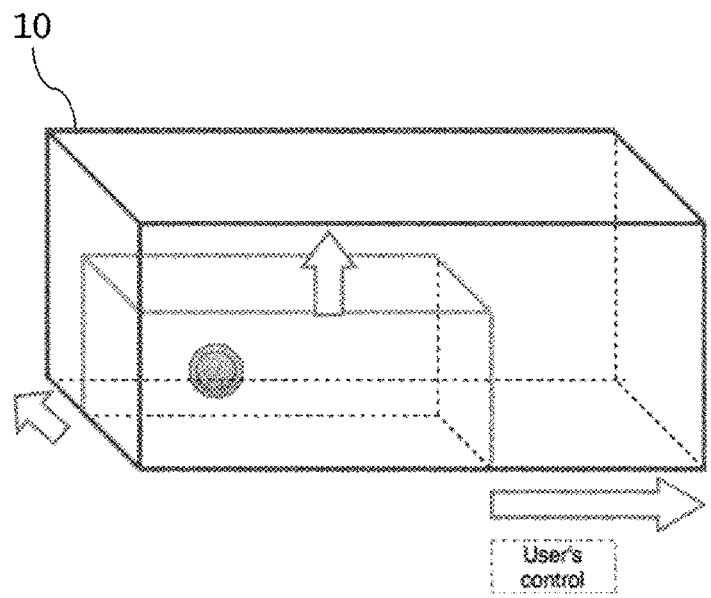
FIG. 18 is a diagram illustrating a method of changing a characteristic of a spatial sound based on a control value by an audio signal processing apparatus according to another embodiment.

FIG. 18 is a diagram illustrating a method of changing a characteristic of a spatial sound based on a control value by an audio signal processing apparatus 100 according to another embodiment. According to an embodiment, the audio signal processing apparatus 100 may change the spatial information related to the virtual space based on the control value. For example, the audio signal processing apparatus 100 may obtain a control value based on a user input. The audio signal processing apparatus 100 may receive a control value through an external input device mounted on the audio signal processing apparatus 100 or connected to the audio signal processing apparatus 100. Also, the audio signal processing apparatus 100 may determine levels of the direct sound, the early reflection, and the late reverberation generated by the above-described method based on the control value. For example, the control value may be a value for adjusting the relative level and delay between the direct sound, the early reflection, and the late reverberation component. The control value may be a value for changing spatial information related to the virtual space including the virtual sound source corresponding to the input audio signal. Alternatively, the control value may be a value for adjusting the tone and the signal level itself. In addition, the audio signal processing apparatus 100 may generate an output audio signal using the spatial information changed based on the control value.

Figure 19:
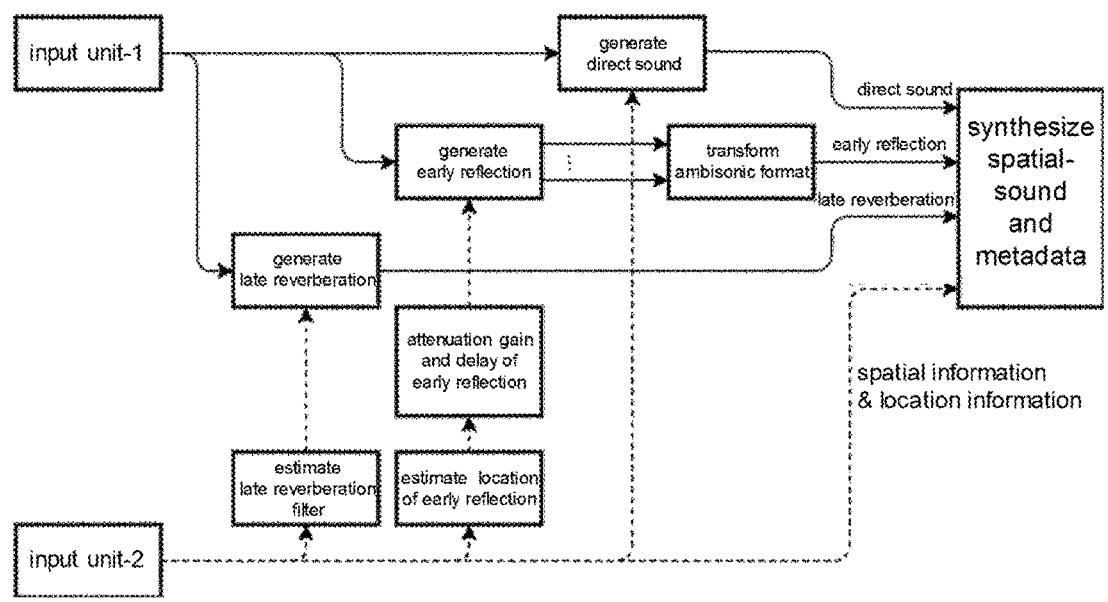
FIGS. 19 and 20 illustrate an audio signal processing system including a process of generating a spatial sound signal corresponding to an input audio signal FIG. 19 and a process of binaural rendering the spatial sound signal to generate an output audio signal FIG. 20, according to another embodiment of the present disclosure.
Figure 20:
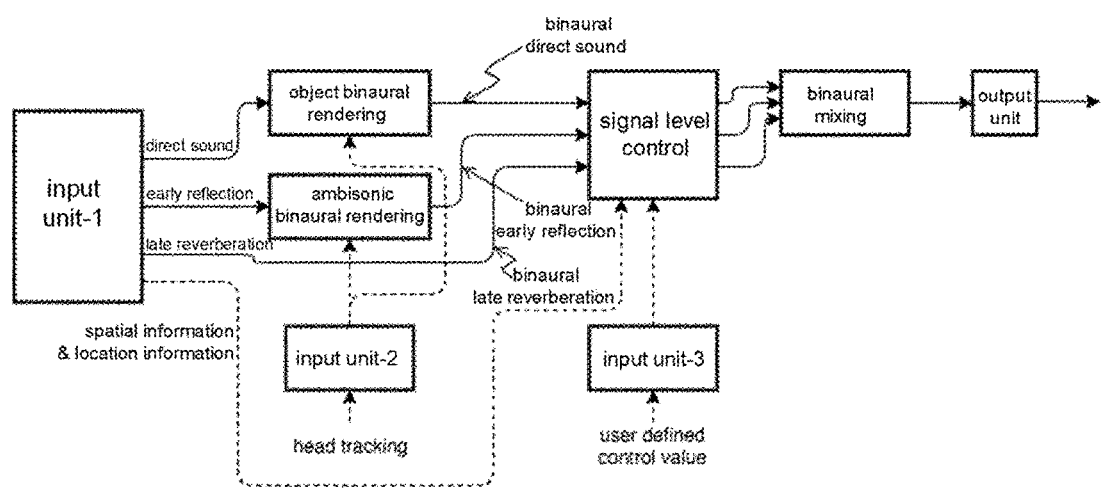

FIGS. 19 and 20 illustrate an audio signal processing system including a process of generating a spatial sound signal corresponding to an input audio signal FIG. 19 and a process of binaural rendering the spatial sound signal to generate an output audio signal FIG. 20, according to another embodiment of the present disclosure. According to an embodiment, the audio signal processing apparatus 100 may generate a spatial sound including the direct sound, the early reflection, and the late reverberation component based on the input audio signal. In addition, the audio signal processing apparatus 100 may generate an output audio signal by processing the generated spatial sound for each component.

Referring to FIG. 19, the audio signal processing apparatus 100 may obtain an input audio signal through a first input unit. In addition, the audio signal processing apparatus 100 may obtain spatial information through the second input unit. In this case, the first input unit and the second input unit may be one input unit. The audio signal processing apparatus 100 may generate reflected sound based on the input audio signal. In this case, the above-described embodiments of FIGS. 4 to 17 may be applied. In addition, the audio signal processing apparatus 100 may distinguish the reflected sound into the early reflection and the late reverberation as described above with reference to FIG. 2. In this case, the audio signal processing apparatus 100 may generate the early reflection and the late reverberation as separate tracks. In this case, the audio signal processing apparatus 100 may generate the early reflection and the late reverberation in parallel.

According to an embodiment, the audio signal processing apparatus 100 may generate an object format early reflection based on an input audio signal, spatial information, a location of a virtual sound source, and a location of a listener. Also, the audio signal processing apparatus 100 may convert the object format early reflection into an ambisonic format (B-format) signal. Next, the audio signal processing apparatus 100 may generate a spatial sound including the direct sound, the ambisonic format early reflection, and the late reverberation generated based on the input audio signal, and the spatial information. Alternatively, the audio signal processing apparatus 100 may generate a bit stream containing the direct sound, the ambisonic format early reflection, and the late reverberation. In addition, the bit stream may include the spatial information related to the virtual space including the virtual sound source and the listener corresponding to the input audio signal, and the location information of the virtual sound source and the listener. The audio signal processing apparatus 100 may transmit the generated bit stream to another device connected to the audio signal processing apparatus 100.

Referring to FIG. 20, according to an embodiment, the audio signal processing apparatus 100 may generate an output audio signal by binaural rendering the generated spatial sound. Alternatively, the audio signal processing apparatus 100 may obtain a bit stream generated by another device connected to the audio signal processing apparatus 100 through the first input unit. In this case, the bit stream may contain a direct sound, an ambisonic format early reflection and late reverberation, which are generated based on an input audio signal from another device.

According to an embodiment, the audio signal processing apparatus 100 may separate the component of the direct sound, the early reflection, and the late reverberation included in the bit stream based on the metadata received along with the bit stream. Also, the audio signal processing apparatus 100 may receive the head movement information of the listener through a second input unit. In this case, the first input unit and the second input unit may be one input unit. The audio signal processing apparatus 100 may generate the binaural direct sound by binaural rendering the separated direct sound based on the location and the head movement information of the listener. In this case, the audio signal processing apparatus 100 may use the object binaural rendering. Also, the audio signal processing apparatus 100 may generate the binaural early reflection by binaural rendering the separated early reflection based on the head movement information of the listener. In this case, the audio signal processing apparatus 100 may use the ambisonic binaural rendering. Next, the audio signal processing apparatus 100 may generate an output audio signal by synthesizing the generated binaural direct sound, the generated binaural early reflection, and the late reverberation.

According to an embodiment, the audio signal processing apparatus 100 may generate an output audio signal by adjusting signal levels of the binaural direct sound, the binaural early reflection, and the late reverberation generated based on spatial information. For example, the audio signal processing apparatus 100 may generate the output audio signal based on a control value received through a third input unit. In this case, the embodiments described with reference to FIG. 18 may be applied.

Some embodiments may be implemented as a form of a recording medium including instructions, such as program modules, executable by a computer. A computer-readable medium may be any available medium accessible by a computer, and may include all of volatile and non-volatile media and detachable and non-detachable media. Furthermore, the computer-readable medium may include a computer storage medium. The computer storage medium may include all of volatile and non-volatile media and detachable and non-detachable media implemented by any method or technology for storing information such as computer-readable instructions, data structures, program modules, or other data.

Furthermore, in the present disclosure, the term "unit" may indicate a hardware component such as a processor or a circuit and/or a software component executed by a hardware component such as a processor.

The above description is merely illustrative, and it would be easily understood that those skilled in the art could easily make modifications without departing from the technical concept of the present disclosure or changing essential features. Therefore, the above embodiments should be considered illustrative and should not be construed as limiting. For example, each component described as a single type may be distributed, and likewise, components described as being distributed may be implemented as a combined form.

Although the present invention has been described using the specific embodiments, those skilled in the art could make changes and modifications without departing from the spirit and the scope of the present invention. That is, although the embodiments of binaural rendering for audio signals have been described, the present invention can be equally applied and extended to various multimedia signals including not only audio signals but also video signals. Therefore, any derivatives that could be easily inferred by those skilled in the art from the detailed description and the embodiments of the present invention should be construed as falling within the scope of right of the present invention.

What is claimed is:

1. An audio signal processing apparatus for rendering an input audio signal comprising:
   a receiver configured to receive the input audio signal;
   a processor configured to generate an output audio signal for reproducing a virtual sound source corresponding to the input audio signal in a virtual space; and
   an output unit configured to output the output audio signal generated by the processor,
   wherein the processor is configured to:
   obtain spatial information related to the virtual space comprising a virtual sound source corresponding to the input audio signal and a listener,
   filter the input audio signal based on a location of the virtual sound source and the spatial information to generate at least one reflected sound corresponding to each of at least one mirror plane in the virtual space,
   obtain a relative location of a virtual reflect sound source with respect to a location and a view-point of the listener, based on information of the view-point of the listener and a location of the virtual reflect sound source corresponding to each of the at least one reflected sound,
   obtain a first spectral modification filter and a second spectral modification filter different from each other,
   wherein the first spectral modification filter is a filter modeling a predetermined frequency characteristic of a sound incident to a front side of the view-point of sight of the listener, and the second spectral modification filter is a filter modeling a predetermined frequency characteristic of a sound incident to a rear side of the view-point of sight of the listener and attenuating an output of a high frequency band compared to the first spectral modification filter,
   obtain an impulse model pair corresponding to each of the at least one reflected sound based on an ipsilateral transfer function and a contralateral transfer function,
   wherein the impulse model pair includes an ipsilateral attenuation gain, a contralateral attenuation gain, an ipsilateral delay and a contralateral delay,
   wherein the ipsilateral attenuation gain is determined based on a magnitude of the ipsilateral transfer function,
   wherein the contralateral attenuation gain is determined based on the ipsilateral attenuation gain and a magnitude of an interaural level difference (ILD),
   wherein the ipsilateral delay and the contralateral delay is determined based on a magnitude of an interaural time difference (ITD),
   wherein the ILD indicates a difference in sound level between an ipsilateral side and a contralateral side,
   wherein the ITD indicates a time delay difference between the ipsilateral side and the contralateral side based on the ipsilateral transfer function and the contralateral transfer function, and
   binaural render the at least one reflected sound filtered based on the relative location of the virtual reflect sound source, the first spectral modification filter, the second spectral modification filter and the impulse model pair to generate the output audio signal.

2. The audio signal processing apparatus of claim 1, wherein the processor is further configured to:
   generate a third spectral modification filter corresponding to each of the at least one reflected sound by weighted summing the first spectral modification filter and the second spectral modification filter based on the relative location of the virtual reflect sound source, and
   binaural render the at least one reflected sound filtered based on the third spectral modification filter to generate the output audio signal.

3. The audio signal processing apparatus of claim 1, wherein the processor is further configured to:
   obtain at least one updated reflected sound and an updated binaural parameter pair corresponding to each of the at least one updated reflected sound, based on a change in the locational relationship between the virtual sound source and the listener, and
   apply a fade-out window to a first set of reflected sounds generated by binaural rendering the at least one reflected sound based on the binaural parameter pair, and apply a fade-in window to a second set of reflected sound generated by binaural rendering the updated at least one reflected sound based on the updated binaural parameter pair to generate the output audio signal.

4. The audio signal processing apparatus of claim 1, wherein the processor is further configured to:
   transform the at least one reflected sound to a first m-th order ambisonics signal, based on location information indicating the relative location of the virtual reflect sound source corresponding to each of the at least one reflected sound and a basis of m-th order spherical harmonic, and
   binaural render the first m-th order ambisonics signal to generate the output audio signal.

5. The audio signal processing apparatus of claim 4, wherein the processor is further configured to:
   update the view-point of the listener based on the head movement information of the listener, generate a second m-th order ambisonics signal by rotating the first m-th order ambisonics signal based on the updated view-point of the listener and a rotation matrix, and generate the output audio signal based on the second m-th order ambisonics signal.

6. The audio signal processing apparatus of claim 4, wherein the processor is further configured to:

determine a reference reflection order based on the spatial information, filtering the input audio signal based on the spatial information to generate a late reverberation having a reflection order that exceeds the reference reflection order, and generate an output audio signal comprising the generated late reverberation and the at least one binaural rendered reflected sound.

7. The audio signal processing apparatus of claim 6, wherein the spatial information comprises mirror plane number information indicating the number of the mirror plane, and wherein the processor is further configured to determine the reference reflection order based on the mirror plane number information and a processing performance of the processor.

8. The audio signal processing apparatus of claim 1, wherein the spatial information comprises a reflectance corresponding to each of the at least one mirror plane, and wherein the processor is further configured to filter the input audio signal based on the reflectance to generate the at least one reflected sound.

9. The audio signal processing apparatus of claim 1, wherein the processor is further configured to:

determine attenuation gain and delay corresponding to each of the at least one mirror plane based on a distance between the listener and each of the virtual reflect sound source, and filtering the input audio signal based on the attenuation gain and the delay to generate the at least one reflected sound.

10. A method of operating an audio signal processing apparatus for generating an output audio signal reproducing a virtual sound source corresponding to an input audio signal in a virtual space comprising the step of:

receiving the input audio signal;

obtaining spatial information related to the virtual space comprising a listener and a virtual sound source corresponding to the input audio signal;

generating at least one reflected sound corresponding to each of at least one mirror plane in the virtual space by filtering the input audio signal based on a location of the virtual sound source and the spatial information;

obtaining a relative location of a virtual reflect sound source with respect to a location and a view-point of the listener based on a location of the virtual reflect sound source corresponding to each of the at least one reflected sound and view-point information of the listener;

obtaining a first spectral modification filter and a second spectral modification filter different from each other;

wherein the first spectral modification filter is a filter modeling a predetermined frequency characteristic of a sound incident to a front side of the view-point of sight of the listener, and the second spectral modification filter is a filter modeling a predetermined frequency characteristic of a sound incident to a rear side of the view-point of sight of the listener and attenuating an output of a high frequency band compared to the first spectral modification filter, obtaining an impulse model pair corresponding to each of the at least one reflected sound based on an ipsilateral transfer function and a contralateral transfer function, wherein the impulse model pair includes an ipsilateral attenuation gain, a contralateral attenuation gain, an ipsilateral delay and a contralateral delay, wherein the ipsilateral attenuation gain is determined based on a magnitude of the ipsilateral transfer function, wherein the contralateral attenuation gain is determined based on the ipsilateral attenuation gain and a magnitude of an interaural level difference (ILD), wherein the ipsilateral delay and the contralateral delay is determined based on a magnitude of an interaural time difference (ITD), wherein the ILD indicates a difference in sound level between an ipsilateral side and a contralateral side, wherein the ITD indicates a time delay difference between the ipsilateral side and the contralateral side based on the ipsilateral transfer function and the contralateral transfer function, and binaural rendering the at least one reflected sound filtered based on the relative location of the virtual reflect sound source, the first spectral modification filter, the second spectral modification filter and the impulse model pair to output the output audio signal.

11. The audio signal processing method of claim 10, wherein the method further comprises generating a third spectral modification filter corresponding to each of the at least one reflected sound by weighted summing the first spectral modification filter and the second spectral modification filter based on the relative location of the virtual reflect sound source, and wherein the binaural rendering the at least one reflected sound comprises binaural rendering the at least one reflected sound filtered based on the third spectral modification filter to output the output audio signal.

12. The audio signal processing method of claim 10, wherein the outputting of the output audio signal comprises:

transforming the at least one reflected sound to an m-th order ambisonics signal based on a basis of an m-th order spherical harmonics and location information indicating the relative location of the virtual reflect sound source corresponding to each of the at least one reflected sound; and binaural rendering the m-th order ambisonics signal to output the output audio signal.

13. A non-transitory computer-readable recording medium on which a computer program is recorded for executing the method of claim 10.

* * * * *